United States Patent
Andoche et al.

(10) Patent No.: US 11,625,899 B2
(45) Date of Patent: Apr. 11, 2023

(54) SERVER, METHOD, AND COMPUTER-READABLE STORAGE MEDIUM FOR SELECTING EYEWEAR EQUIPMENT

(71) Applicant: Essilor International, Charenton-le-Pont (FR)

(72) Inventors: Julien Andoche, Charenton-le-Pont (FR); Estelle Netter, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 26 days.

(21) Appl. No.: 17/297,578

(22) PCT Filed: Nov. 18, 2019

(86) PCT No.: PCT/EP2019/081652
§ 371 (c)(1),
(2) Date: May 27, 2021

(87) PCT Pub. No.: WO2020/109056
PCT Pub. Date: Jun. 4, 2020

(65) Prior Publication Data
US 2022/0036658 A1  Feb. 3, 2022

(30) Foreign Application Priority Data
Nov. 30, 2018 (EP) .................. 18315046

(51) Int. Cl.
*G06T 19/00* (2011.01)
*G06T 7/70* (2017.01)
*G06V 40/16* (2022.01)

(52) U.S. Cl.
CPC .............. *G06T 19/006* (2013.01); *G06T 7/70* (2017.01); *G06V 40/165* (2022.01);
(Continued)

(58) Field of Classification Search
CPC ............. G06T 19/006; G06T 7/70; G06T 2207/20084; G06T 2207/30201; G06V 40/169; G06V 40/165
(Continued)

(56) References Cited

U.S. PATENT DOCUMENTS

2018/0268458 A1\* 9/2018 Popa ................ G06Q 30/02
2019/0164210 A1\* 5/2019 Kornilov ............ G06Q 30/0631

OTHER PUBLICATIONS

International Search Report and Written Opinion dated Jan. 2, 2020 in PCT/EP2019/081652 filed Nov. 18, 2019.
(Continued)

*Primary Examiner* — Hai Tao Sun
(74) *Attorney, Agent, or Firm* — Oblon, McClelland, Maier & Neustadt, L.L.P.

(57) ABSTRACT

A server includes processing circuitry configured to receive one or more images, the one or more images including one or more representations of people. Additionally, the processing circuitry is configured to apply a neural network to the one or more images, wherein the neural network classifies at least one aesthetic component of each image of the one or more images, an aesthetic component score being generated for each image in the one or more images. Further, the processing circuitry is configured to generate a user eyewear equipment profile for a user, the user being matched to a persona from a personae database, each persona in the personae database being linked to one or more persona eyewear equipment profiles, the one or more persona eyewear equipment profiles being based on the aesthetic component score, and select eyewear equipment for the user based on the generated user eyewear equipment profile.

15 Claims, 14 Drawing Sheets

(52) U.S. Cl.
CPC .. *G06V 40/169* (2022.01); *G06T 2207/20084* (2013.01); *G06T 2207/30201* (2013.01)

(58) Field of Classification Search
USPC .......................................................... 345/633
See application file for complete search history.

(56) References Cited

OTHER PUBLICATIONS

Gu, X., et al., "iGlasses: A Novel Recommendation System for Best-fit Glasses", Proceedings of the 39th International ACM SIGIR Conference on Research and Development in Information Retrieval, 2016, XP055588771, pp. 1109-1112.

Costello, E., et al., "iCARE: Intelligent Customer Assistance for Recommending Eyewear", Proceedings of The 11th International Conference Intelligent User Interfaces, 2006, XP055588775, pp. 282-284.

* cited by examiner

SERVER, METHOD, AND COMPUTER-READABLE STORAGE MEDIUM FOR SELECTING EYEWEAR EQUIPMENT

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Online business needs personalized product recommendations to push the right visual equipment at the right time to the consumers. For example, some consumers are more sensitive to fashion and trends than any other criteria. Generally, an eyewear equipment or product recommendation can be accomplished through morphological rules, analysis of a style, lifestyle, and/or personality questionnaire, and analysis of the consumer browsing history. However, there is a need for more personalized and more accurate eyewear equipment recommendations.

SUMMARY

According to aspects of the disclosed subject matter, a server includes processing circuitry configured to receive one or more images, the one or more images including one or more representations of people. Additionally, the processing circuitry is configured to apply a neural network to the one or more images wherein the neural network classifies at least one aesthetic component of each image of the one or more images, an aesthetic component score being generated for each image in the one or more images. Further, the processing circuitry is configured to generate a user eyewear equipment profile for a user, the user being matched to a persona from a personae database, each persona in the personae database being linked to one or more persona eyewear equipment profiles, the one or more persona eyewear equipment profiles being based on the aesthetic component score, and select eyewear equipment for the user based on the generated user eyewear equipment profile.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, terms such as "first," "second," "third," etc., merely identify one of a number of portions, components, points of reference, operations and/or functions as described herein, and likewise do not necessarily limit embodiments of the disclosed subject matter to any particular configuration or orientation.

Figure 1:
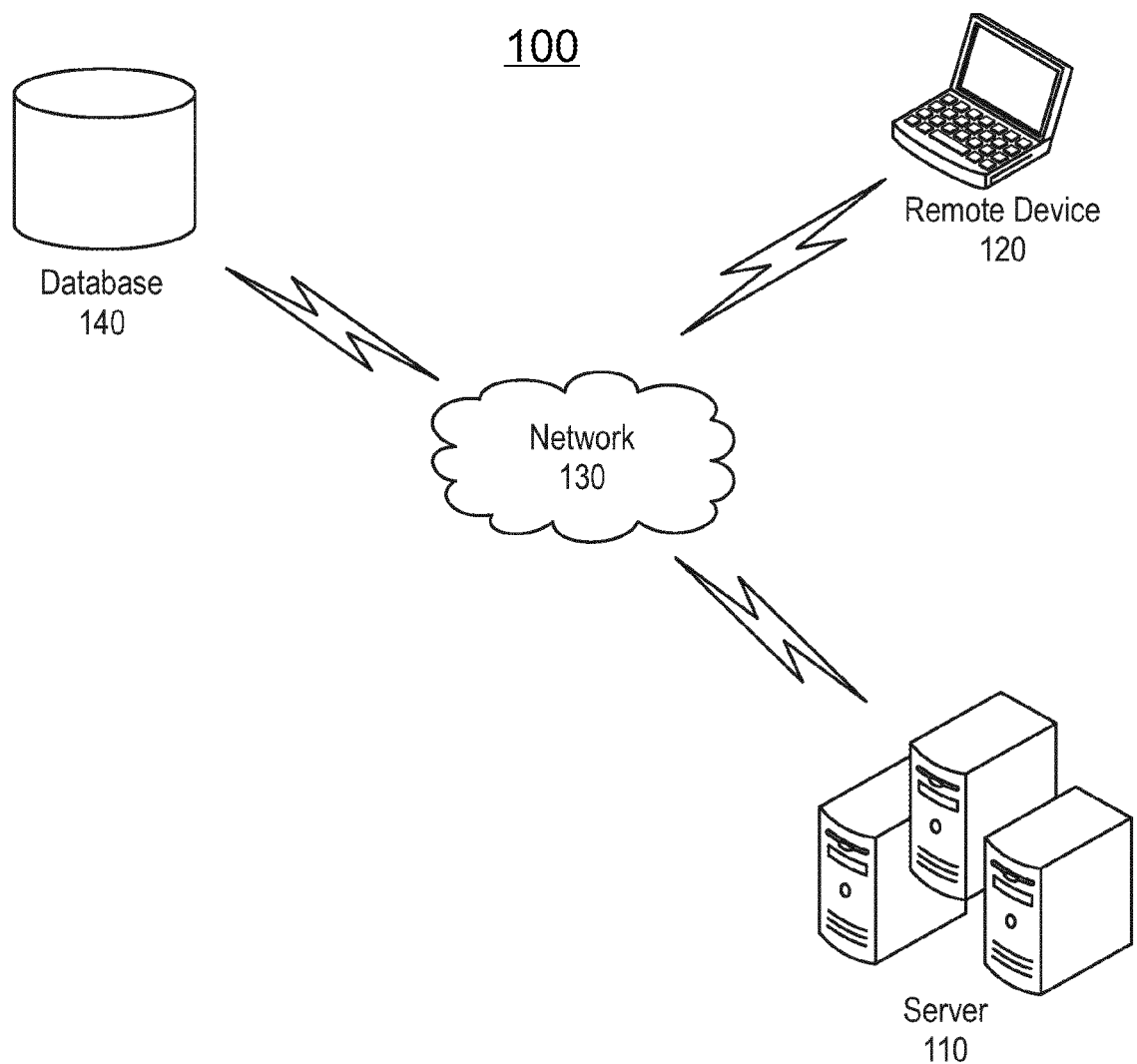
FIG. 1 illustrates an eyewear equipment recommendation system according to one or more aspects of the disclosed subject matter.

Referring now to the drawings, wherein like reference numerals designate identical or corresponding parts throughout the several views, FIG. 1 illustrates an eyewear equipment recommendation system 100 (herein referred to as the system 100) according to one or more aspects of the disclosed subject matter. The system 100 can include a server 110, a remote device 120, and a database 140 communicably coupled via a network 130.

The server 110 can represent one or more servers communicably coupled to the remote device 120 and the database 140 via the network 130. The server 110 can include a computer, laptop, smart phone, tablet, PDA, and the like. The server 110 can include processing circuitry configured to select eyewear equipment for a user using a neural network to analyze fashion trends and recommend that eyewear equipment to that user based on matching the user to persona linked to specific eyewear equipment, which can then be linked to that user, as further described herein.

The remote device 120 can represent one or more remote devices communicably coupled to the server 110 and the database 140 via the network 130. The remote device 120 can include a computer, laptop, smart phone, tablet, PDA, and the like.

The database 140 can represent one or more databases communicably coupled to the server 110 and the remote device 120 via the network 130.

The network 130 can represent one or more networks connecting the server 110, the remote device 120, and the database 140. The network 130 can be a public network, such as the Internet, a private network such as a local area network (LAN) or a wide area network (WAN) network, or any combination thereof and can also include a public switched telephone network (PSTN) or integrated services for digital network (ISDN) sub-networks. The network 130 can also be wired, such as an Ethernet network or a USB port, or can be wireless such as a cellular network including EDGE, 3G 4G, LTE/LTE-A, etc. wireless cellular systems. The wireless network can also be Wi-Fi, Bluetooth, or any other wireless form of communication that is known.

It should be appreciated that throughout the specification, the terms eyewear equipment and visual equipment can be interchangeable. Additionally, the terms photo, picture, and image can be interchangeable. Further, the terms user and consumer can be interchangeable.

Generally, the system 100 can recommend eyewear equipment to a user based on eyewear equipment characteristics associated with the user. The user can be a customer/consumer and/or a potential customer, for example. To recommend eyewear equipment based on eyewear equipment characteristics of the user, the system 100 can detect one or more fashion trends, and identify popular eyewear characteristics for a predetermined persona based on the one or more fashion trends. Then, the system 100 can identify eyewear equipment characteristics for a user based on the predetermined persona corresponding to the user. Once the eyewear equipment characteristics are identified, the system 100 can make an eyewear equipment recommendation based on the eyewear equipment characteristics of the user.

Making the best possible recommendation and the timing of the recommendation are crucial to effectively recommend eyewear equipment. In this context, the technical solution to this technical problem can include automatically scoring all the available frames in the retailer catalogue as a function of global trends or as a function of eyewear specific trends, extracted from undistinguished opinions or focused on the opinions of a pre-selected panel of influencers and/or famous people, personalized for a specific user or targeted to anyone sensitive to trends and fashion. The opinions of the pre-selected panel of influencers and/or famous people can correspond to any data source and/or media format including social media engagement (e.g., likes, comments, shares, etc.). Additionally, the technical solution can include automatically attracting the consumer by advising him of the opinion of a specific celebrity. Further, the "opinion" of the celebrity can include the fact that the celebrity appears in a photo where they are also actually wearing the same eyewear equipment that they are recommending to the consumer.

More specifically, regarding detecting the fashion trends, the system 100 can receive a plurality of images, and the plurality of images can be images of one or more people, for example. The system 100 can calculate a score for each of the plurality of images based on an estimated trend level. In one aspect, the trend level can be based on a number of times a specific item and/or aesthetic component in the image appears throughout the plurality of images. For example, if the color red appears with a high frequency throughout the received plurality of images, the color red may have a high trend level.

Additionally, the system 100 can determine if the user requests an eyewear equipment recommendation based on a synthesis of all the detected trends. For this type of request, the system 100 can output global trend statistics in response to the request being based on the synthesis of all trends. Further, the global trend statistics can be based on the score calculated for each of the plurality of images. Alternative, or additionally, the user can request an eyewear equipment recommendation based on an eyewear trend specifically. Accordingly, the system 100 can output eyewear trend statistics, which can be based on the score calculated for each of the plurality of images. Additionally, in one aspect, the score can be incorporated into the global trend statistics and the eyewear trend statistics when the score is greater than a predetermined minimum score.

Further, when identifying popular eyewear characteristics for a predetermined persona based on the one or more fashion trends, the system 100 can define or compute a set of personae based on a human typical profile as further described herein, which can be based on the received plurality of images from publically available media corresponding to a panel of pre-selected celebrities or trend setters, for example. The system 100 can then associate each pre-selected celebrity or trend setter with a matching persona in the personae database. The association can be based on physical and context characteristics of the pre-selected celebrity or trend setter, for example. For each persona, the system 100 can associate eyewear equipment to each persona in the set of personae.

Additionally, in response to the received one or more images being one or more images of the user, the system 100 can generate a profile for the user, associate the user to a matching persona, and associate the user with eyewear equipment based on the matching persona. Accordingly, the recommendation can be completely customized for the user because the eyewear equipment recommendation will be based on the trends that are appealing to the user and based on the fashion style of the user.

Figure 2:
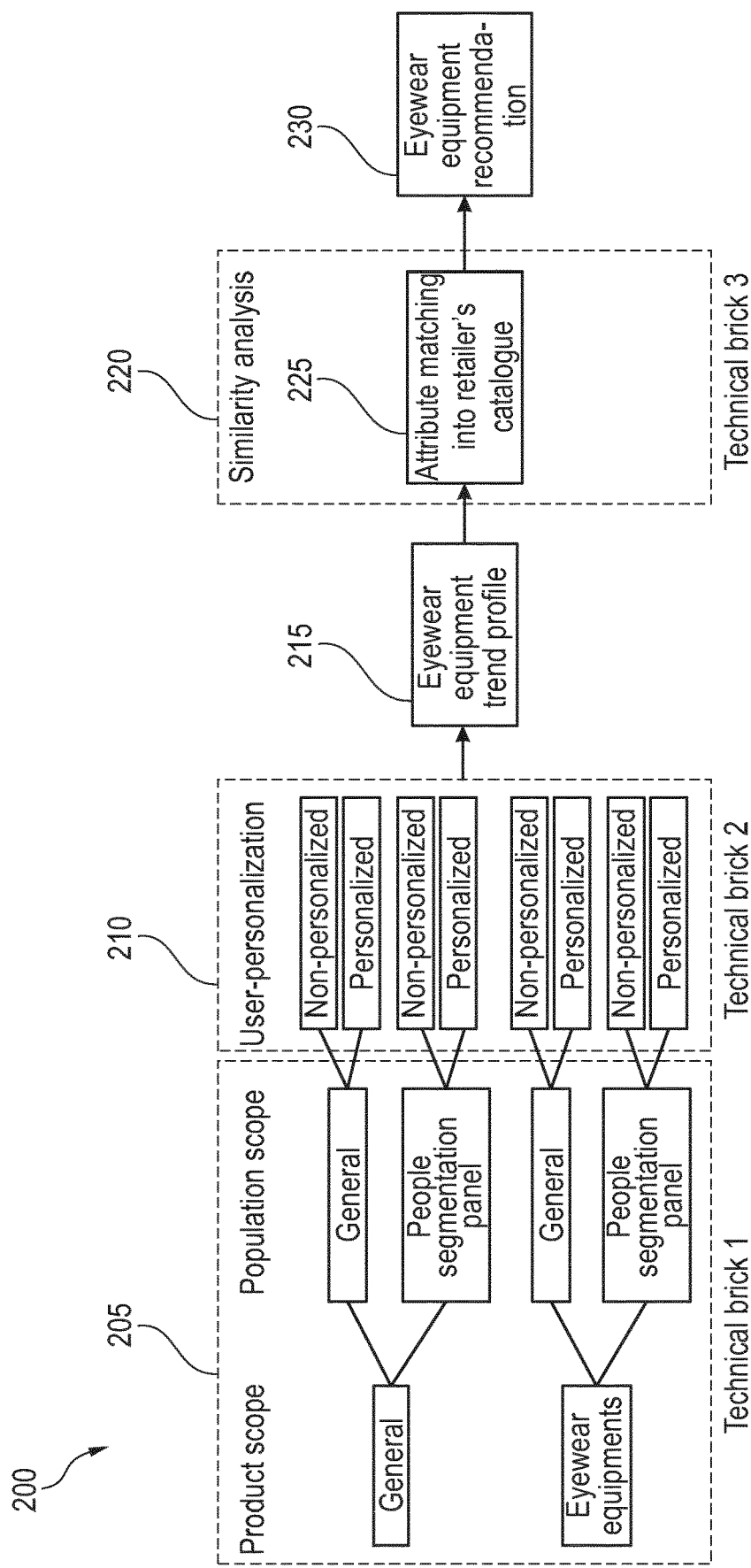
FIG. 2 illustrates an eyewear equipment recommendation workflow according to one or more aspects of the disclosed subject matter.

FIG. 2 illustrates an eyewear equipment recommendation workflow 200 according to one or more aspects of the disclosed subject matter. The workflow 200 can include a fashion trend block 205, a user-personalization block 210, an eyewear equipment trend profile block 215, a similarity analysis block 220 which includes an attribute matching into a retailer's catalogue block 225, and an eyewear equipment recommendation block 230.

The fashion trend block 205 can include a product scope of the fashion trend and a population scope of the fashion trend. For example, the trend aspects can be determined from a general point of view including examining particular clothes and accessories such as hats, jewelry, makeup, clothes, handbags, shoes, scarves, shapes, colors, and the like, or from the examination of eyewear equipment specifically. Further, the trends can be determined from the opinion of a panel of influential people or from an undistinguished opinion, such as feedback from the general population who may or may not have any reputation in the fashion industry. In other words, the product scope can include a general scope which can correspond to a user requesting a synthesis of all fashion trends, and the population scope can include a general panel, which can correspond to undistinguished opinions, and a segmentation panel, which can include the opinions of a pre-selected group of trend setters and/or celebrities, for example. Alternatively, or additionally, the segmentation panel can include a specific category of people, and the specific category can be associated with age, gender, a socio-professional category, and the like, for example.

In one embodiment, identifying the fashion trend in the fashion trend block 205 can be based on image processing, for example. In this case, a neural network can be used for image processing.

Figure 3:
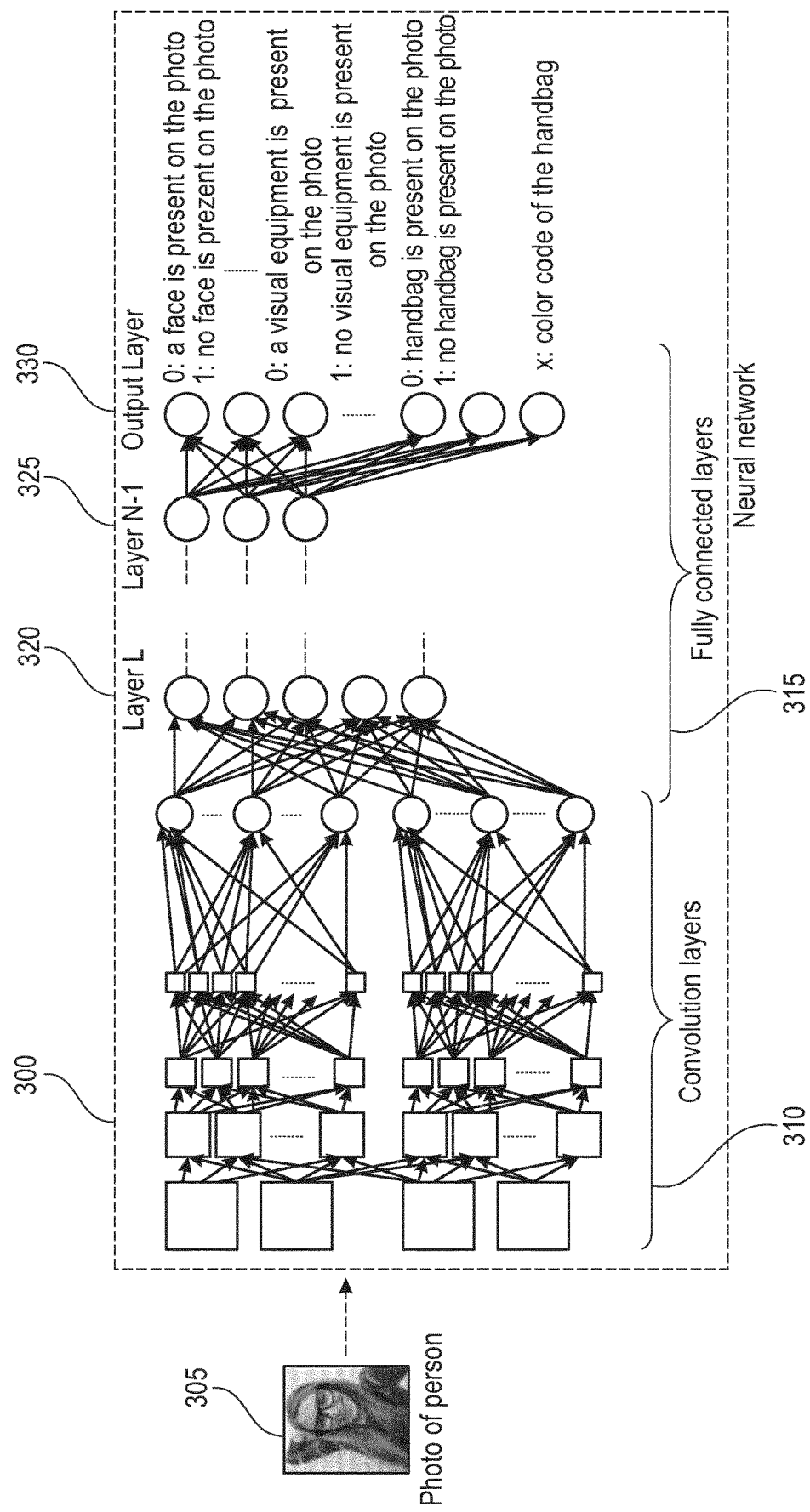
FIG. 3 illustrates a visual representation of an exemplary neural network according to one or more aspects of the disclosed subject matter.

FIG. 3 illustrates a visual representation of an exemplary neural network 300 according to one or more aspects of the disclosed subject matter. The neural network 300 can receive a photo 305 as input. The photo 305 can be of one or more people, for example. Additionally, the neural network 300 can include convolutional layers 310 and fully connected layers 315. The fully connected layers 315 can include one or more layers including an L layer 320 through an N−1 layer 325, for example. Additionally, the fully connected layers 315 can include an output layer 330.

First, the neural network 300 can receive labeled photos. The photos that need to be labeled can be photos that include one or more people, such as photo 305, and the photos can be of the people's faces and/or entire body. Additionally, the people in the photos can be wearing eyewear equipment or not wearing eyewear equipment. Further, one or more of the plurality of photos can be of eyewear equipment specifically.

For the labeling process for detecting eyewear trends specifically, the eyewear equipment in the photos where people are wearing eyewear equipment can be labeled. For example, the frame manufacturers, the lens manufacturers, and the like can label the eyewear equipment to describe its shape, thickness, frame materials, color, lens color, minor effect, or the brand of the eyewear equipment.

For the labeling processing for detecting a general trend, both objective and subject information can be gathered to label each image. For example, for each image, any person can be asked for objective information to label the image, and people from the fashion industry can be asked to label the image for subjective information based on their expertise, for example. Objective information can include information about the person in the picture including gender, age approximation, hair color, eye color, skin color, and the like. Additionally, the objective information can include contextual labels about the person including what the person does, where the person is in the photo such as outdoors, indoors, at the beach, commuting, and the like. The subjective information can include a style of the person in the image with labels including glamour, chic, strict, and the like. In this case, professionals from the fashion industry should label preferentially. Additionally, the subjective information can include labels for clothes and accessories worn by the person including a type, color, shape, brand, pattern, texture, product category, details, and features of items including hats, jewelry, makeup, clothes, handbags, shoes, and the like.

After the labeling, the labeled images can be used to build a deep learning database. The deep learning database can correspond to one of the one or more databases 140, for example. Next, a deep learning algorithm can be trained using the deep learning database by using the convolution layers 310 for feature map extraction from each of the labeled images and using the fully connected layers 315 to extract vectors of attributes from the labeled images. Once successfully trained, the algorithm can be used to take as input any picture of a person including just the person's face or showing their entire body, and the neural network 300 can provide various information including information n about the person in the picture (e.g., gender, age approximation, hair color, eye color, skin color, etc.), a context of the person including an activity and a location (e.g., outdoors, indoors, at the beach, and/or commuting), a style of the person (e.g., glamour, chic, strict, etc.), the clothes and accessories worn by the person including one or more of a type, color, shape, brand, pattern, texture, product category, details, and features of hats, jewelry, makeup, clothes, handbags, and shoes, and the attributes of the visual equipment worn by the person. Additionally, the information provided by the neural network 300 can include a confidence level.

In one embodiment, another or several other neural network can be used for text mining (e.g., word2vec) on textual information coming from social media or the user. To build a word and/or tag training corpus, a vocabulary can be defined to include eyewear equipment trend detection and general trend detection as described herein regarding labeling the images. After defining the vocabulary, a vectorial representation of the training vocabulary can be created using the one or more neural networks. Using the vectorial representation of the training corpus, any text can be received and an algorithm (e.g., the k nearest neighbor algorithm) to detect information including information about the person in the picture (e.g., gender, age approximation, hair color, eye color, skin color, etc.), a context of the person including an activity and a location (e.g., outdoors, indoors, at the beach, and/or commuting), a style of the person (e.g., glamour, chic, strict, etc.), the clothes and accessories worn by the person including one or more of a type, color, shape, brand, pattern, texture, product category, details, and features of hats, jewelry, makeup, clothes, handbags, and shoes, and the attributes of the visual equipment worn by the person. Additionally, the information provided by word2vec can include a confidence level.

Returning to FIG. 2, the trend detection block 205 can receive input. Regarding the source of the input, a plurality of images can be provided to the neural network 300, as is already described herein. More specifically, the plurality of images can be a pool of open-source images/videos concerning anybody, or the pool of open-source images/videos can be a panel of pre-selected celebrities and/or trend setters (e.g., with a certain amount of followers), which can come from one or more of open social media profiles, community reviews, fashion magazines, and the like.

Additionally, the fashion trend block 305 can be configured for selection and scoring of the fashion trends. For example, the inputs are selected in a certain time frame in agreement with trend change frequency in the fashion industry (e.g., 6 months). A score, such as an aesthetic component score, can be computed for each selected input according to their estimated level of trend. The aesthetic component score can be calculated based on a number of occurrences of an item (e.g., type, color, shape, product, pattern, brand, product category, etc.) in a text, a picture, or a video, or several texts, several pictures, or several videos. The aesthetic component score can be weighted as a function of criteria including the time when the picture/text was released, the time period when all the input concerning the item was released, the person posting the input (e.g., influencers/celebrities can have a higher weight), the feedback from people regarding the input (e.g., number of likes, number of up thumbs, positive comments, number of retweets, etc.), and the previous scores of the same aesthetical component. As a result, a trend level can be given as a function of the score of each input. Additionally, in one aspect, only the better rated inputs will be processed. For example, the aesthetic component score must be greater than a predetermined minimum score (e.g., score>7/10).

Additionally, the way the information delivered by the neural network 300 is used depends on the use case. For example, for a first use case, the user may want to have an eyewear equipment recommendation based on global trend. In this case, global statistics can be computed from various features detected by the neural network 300 on the selected images or detected by semantic analysis on the selected texts. The various features used to compute the global statistics can include clothes and accessories (e.g., hats, jewelry, makeup, clothes, handbags, shoes, etc.) worn by the person including a type, color, shape, brand, pattern, texture, product category, details, and features.

In another use case, the user may want to have an eyewear equipment recommendation based on an eyewear trend specifically. In this case, eyewear statistics can be computed based on various features detected by the neural network 300 on the selected images or detected by semantic analysis on the selected texts. The various features can include attributes of the eyewear equipment worn by the people in the images, for example.

The output of the fashion trend block 305 can output statistics describing the detected trend (e.g., based on the use case). Additionally, these statistics may take into account the trend level calculated based on the aesthetic component score as has been described herein. Regarding the first use case where the user wants to have an eyewear equipment recommendation based on global trend, the global statistics output can include trendy color (e.g., red was detected to be trendy with a trend level of 9/10), trendy shapes (e.g., round shape was detected to be trendy with a trend level of 8/10), trendy material (e.g., leather was detected to be trendy with a trend level of 8/10), and the like. Regarding the use case where the user wants to have an eyewear equipment recommendation based on an eyewear trend (e.g., frame, lens, etc.) specifically, the eyewear trend statistics can include trendy eyewear color(s) (e.g., red frames were detected to be trendy with a trend level of 9/10), trendy eyewear thickness (e.g., nylor eyeglasses were detected to be trendy with a trend level of 7/10), trendy eyewear shape (e.g., round shape frame were detected to be trendy with a trend level of 8/10), trendy eyewear material (e.g., acetate frames were detected to be trendy with a trend level of 8/10), trendy eyewear texture (e.g., tortoise frames were detected to be trendy with a trend level of 7.5/10), trendy eyewear effects (e.g., lenses with purple reflections were detected to be trendy with a trend level of 8.5/10), and the like.

Regarding the maintenance of the trend detection block 305, the trend detection block 305 can be updated on a regular basis (e.g., six months) to capture the quick trend evolution in the fashion industry. For example, every six months, all previously computed statistics can be cleared, input data (e.g., images or text) can be renewed by clearing previously selected input data, and the data sources (e.g., open profile social media, community review, fashion magazines, etc.) can be reviewed again to select new input data, and new statistics (e.g., global statistics and eyewear trend statistics) can computed from the new selected input data. In one aspect, the trend information from previous cycles can be retained for comparison with the new cycle and may be used to factor into the statistics of the new cycle. For example, where there is significant overlap in a trend (e.g., red is still a popular color), the color red may be weighted more heavily because it is a strong long term trend.

The user-personalization block 210 can address the personalized aspect of the eyewear equipment recommendation. For example, the server 110 can be configured to define or compute a set of typical personae (e.g., gender, age category, style, favorite brands, lifestyle, etc.). A typical person can correspond to a human typical profile (e.g., "urban girl in her twenties who likes premium brands"). After defining or computing the set of typical personae, the server 110 can be configured to associate eyewear equipment to each persona in FIG. 4.

Figure 4:
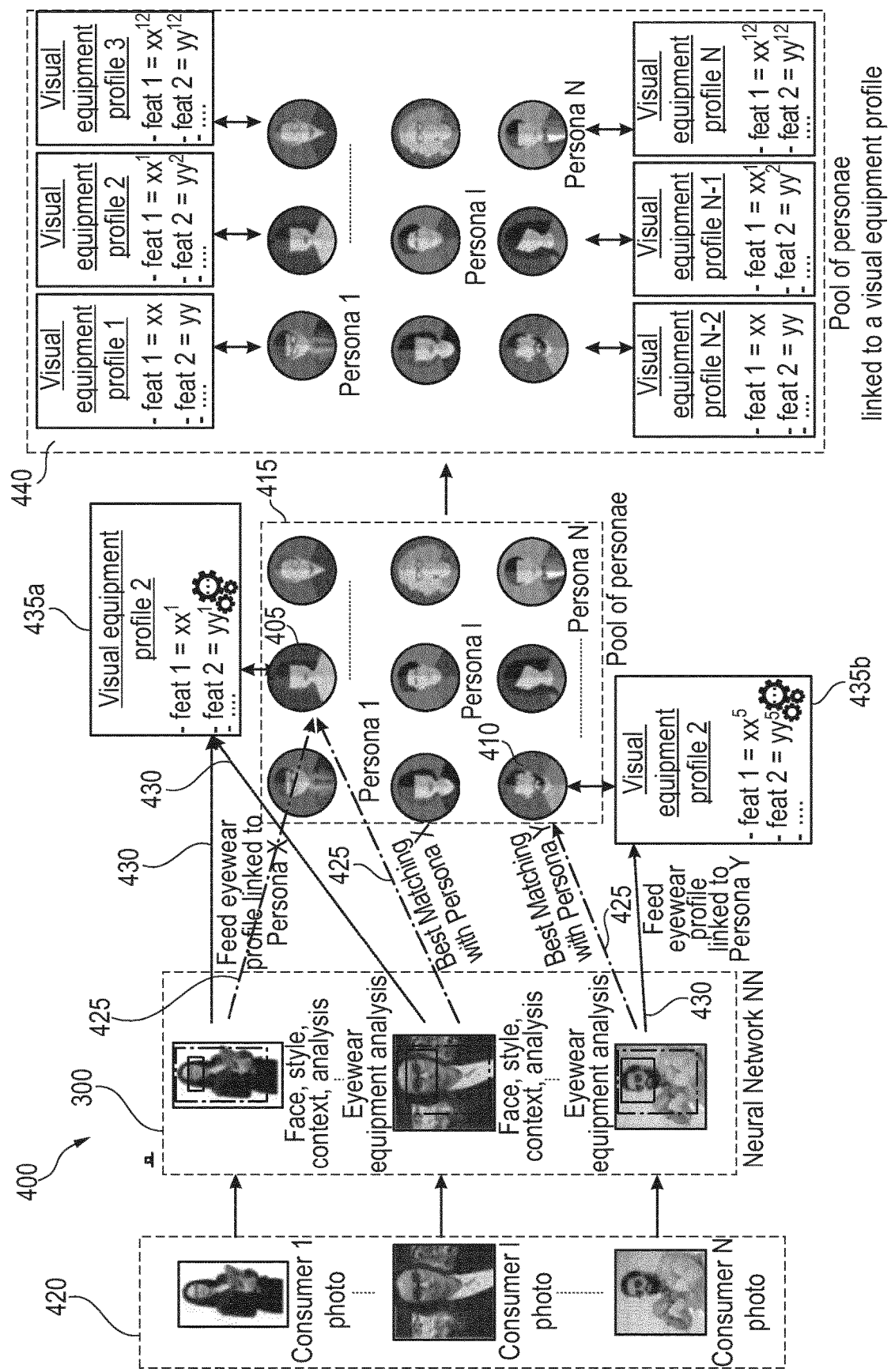
FIG. 4 illustrates an exemplary work flow for determining the most popular eyewear characteristics for one or more persona in a pool of personae according to one or more aspects of the disclosed subject matter.

FIG. 4 illustrates an exemplary work flow 400 for determining the most popular eyewear characteristics for one or more persona (e.g., persona 405 and persona 410) in a pool of personae 415 according to one or more aspects of the disclosed subject matter. To associate eyewear equipment to each persona, the neural network 300 can be applied to each image/video in the pool of open-source images/videos concerning the panel of pre-selected celebrities or trend setters (e.g., input 420). By running the neural network 300 on each image/video of the pool, which generally includes a face, style, context, and eyewear equipment analysis, various information about the one or more people in the images/videos can be obtained. For example, the output of the neural network 300 can provide information about the person in the picture (e.g., gender, age approximation, hair color, eye color, skin color, etc.), a context of the person including what they do and where they are (e.g., outdoor, indoor, at the beach, commuting, etc.), a style of the person (e.g., glamour, chic, strict, etc.), clothes and accessories (e.g., hats, jewelry, makeup, clothes, handbags, shoes, etc.) worn by the person including a type, color, shape, brand, pattern, texture, product category, details, and features, and attributes of the eyewear equipment worn by the person including shape, material, colors, texture, thickness, iconic brands, and the like. In other words, the output of the neural network 300 can be used to determine a best matching persona (e.g., as represented by arrows 425), and a corresponding eyewear profile of the person who was matched to the persona can be fed to a visual equipment profile 435a, 435b corresponding to that persona (e.g., as represented by arrows 430).

Next, each person in the picture can be associated to a persona that is most similar to him/her (e.g., arrows 425). For example, the person will be associated to the persona with the characteristics most that are most similar to him/her, and the characteristics can be based on information about the person in picture output by the neural network 300. Additionally, when associating the person to the persona, different weights $W_1, W_2 \ldots W_N$ can be attributed to different characteristics depending on the situation (e.g., hair color can have a weight of 0.05 compared to style which can have a weight of 0.2 because style has been detected to be more discriminating than hair color from a fashion point of view).

Then, for each persona, the sever 110 can be configured to determine the most popular eyewear characteristics for that persona to generate a pool of personae linked to an eyewear equipment profile 440. For example, the attributes of the eyewear worn by each person of the pool can be linked to the associated persona, and the attributes can be weighted depending on their computed matching level to this persona, as further described herein.

Figure 5:
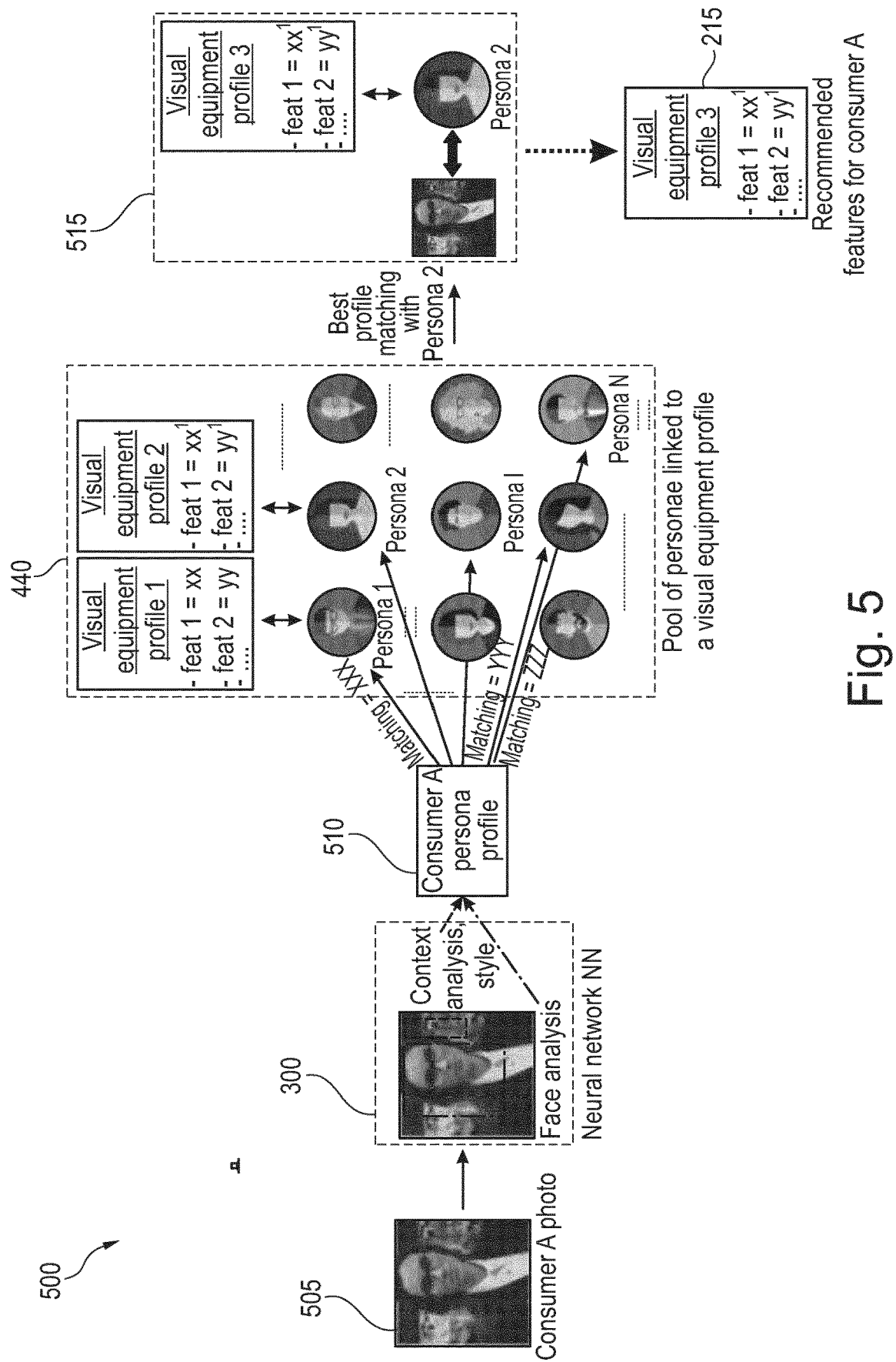
FIG. 5 illustrates an exemplary workflow for identifying what persona corresponds to the consumer according to one or more aspects of the disclosed subject matter.

Referring again to the user-personalization block 210, the server 110 can be configured to identify which persona corresponds to the consumer wanting the eyewear equipment recommendation based on the pool of personae linked to a visual equipment profile 440, which is illustrated in FIG. 5.

FIG. 5 illustrates an exemplary workflow 500 for identifying what persona corresponds to the consumer according to one or more aspects of the disclosed subject matter. For example, the consumer can upload a picture and/or video of themselves that represents them in a context that they like. Alternatively, or additionally, the input can be a questionnaire filled out by the consumer including lifestyle questions, for example. If the consumer uploads a picture and/or video, the same process described above for matching the pool of open-source images/videos concerning a panel of pre-selected celebrities or trend setters can be applied to the picture and/or video of the consumer provided by the consumer. Similarly, if the consumer filled out a questionnaire, the consumer can be associated with a persona based on the word2vec process, for example. As a result, the workflow 500 can determine the eyewear attributes most popular for the consumer by identifying the persona that most closely matches the consumer and linking the eyewear attributes associated with that persona to the consumer.

In other words, referring to FIG. 5, the consumer can provide a photo 505 as input to the neural network 300, which can perform a face analysis, context analysis, style analysis, etc. as described herein. The neural network 300 can output a consumer persona profile 510 that includes all the information identified in the consumer photo 505. The consumer persona profile 510 can be used to match the features included in the consumer persona profile to one or more of the personae in the pool of personae linked to an eyewear equipment profile 440. This matching process can result in a best match, such as match 515. For example, the match 515 can correspond to the consumer having the best match with "Persona 2." Then, as a result of the consumer being most closely matched with "Persona 2," the eyewear equipment profile associated with "Persona 2" can be linked to the consumer, which can correspond to the eyewear equipment trend profile 215. In other words, the eyewear equipment trend profile 215 for the consumer can correspond to the eyewear equipment most popular for the consumer.

Referring again to FIG. 2, the similarity analysis block 220 can be configured to match the attributes of the eyewear equipment trend profile 215 with frames in a retailer's catalogue (i.e., attribute matching block 225). In other words, the similarity analysis block 220 can be configured to adapt the eyewear equipment recommendation to the eyewear equipment available in one or more specific retailer catalogues. For example, from the one or more of the personalized attributes and the trend level of the personalized attributes of eyewear equipment identified from either the trend detection block 205 or the user-personalization block 210, the server 110 can be configured to find a list of eyewear equipment from the retailer catalogue that corresponds to these attributes.

For example, the process for finding and displaying the list of eyewear equipment from the retailer catalogue can include determining the attributes of the eyewear available in the retailer catalogue, associating eyewear attributes most popular for the consumer (e.g., eyewear equipment trend profile 215) to specific eyewear available in the retailer catalogue, and displaying the selection of eyewear equipment to user.

Determining the attributes of the eyewear equipment available in the retailer catalogue can include identifying a shape, material, colors, texture, thickness, iconic brands, and the like of the eyewear equipment. The attributes of the eyewear equipment in the retailer catalogue can be provided manually (e.g., by a person), looked up in the retailer catalogue, scraped from the internet. However, the attributes are preferably the output of the neural network 300 taking as an input the pool of images of the eyewear equipment in the retailer catalogue.

Associating the eyewear attributes most popular for the consumer to specific eyewear available in the retailer catalogue can include maximizing their common characteristics (e.g., shape, material, colors, texture, thickness, iconic brands, etc.). Additionally, maximizing their common characteristics can include taking into account different weights $W_1, W_2 \ldots W_N$, can be attributed to the characteristics depending on the situation. For example, style can have a weight of 0.6, material can have a weight of 0.2, etc. Style can be more heavily weighted because style can have been detected to be a high discriminating parameter among inputs. Alternatively, or additionally, retailers may have decided that style should have more importance than other characteristics. Each trend can be understood as the specialization of a given characteristic. For example, red is one specialization of the characteristic "color." Accordingly, each trend may have a trend level $T_{1,1}, \ldots, T_{i,j} \ldots T_{N,M}$. For example, red frames (i.e., specialization j (red) of characteristic i (color)) were detected to be trendy with a trend level of $T_{i,j}=9/10$). The weights and trend levels are thus combined to compute the desirability level for each attribute:

$$D_{i,j} = W_{characteristic\ i} * T_{trend\ i,j} \qquad \text{Equation 1}$$

For example, as the color characteristic has been given a weight of 0.4, and the red color is trendy and has been given a trend level of 0.9, then, applying Equation 1, the desirability level for red color is: $D_{red\ color}=0.4*0.9=0.36$ Accordingly, a global trend level is computed for each eyewear equipment from its attributes and the computed desirability levels. Equation 1 may be a mean of the desirability level of each attribute of the eyewear equipment. The eyewear equipment with the best global trend levels can be considered trendy for the consumer, and are selected, then an additional selection can be made based on other criteria including promotions, stock (i.e., availability), price, number of displayed items, and the like, depending on the retailer's needs. Finally, the selected eyewear can be displayed to the user/consumer through the remote device 120, for example. Displaying the selected eyewear can correspond to the eyewear equipment recommendation block 230.

In one embodiment, the server 110 can be configured to automatically attract the consumer by advising the consumer of an opinion of a specific celebrity. For example, attracting the consumer based on the opinion of a specific celebrity can be performed in two ways. First, the server 110 can be configured to alert the consumer that the consumer's morphology is similar to a specific celebrity and proposing eyewear equipment to the consumer that is similar to what the specific celebrity currently wears. Second, the server 110 can be configured to alert the consumer that a specific celebrity wears eyewear equipment similar to eyewear equipment that the consumer is currently browsing.

Figure 6:
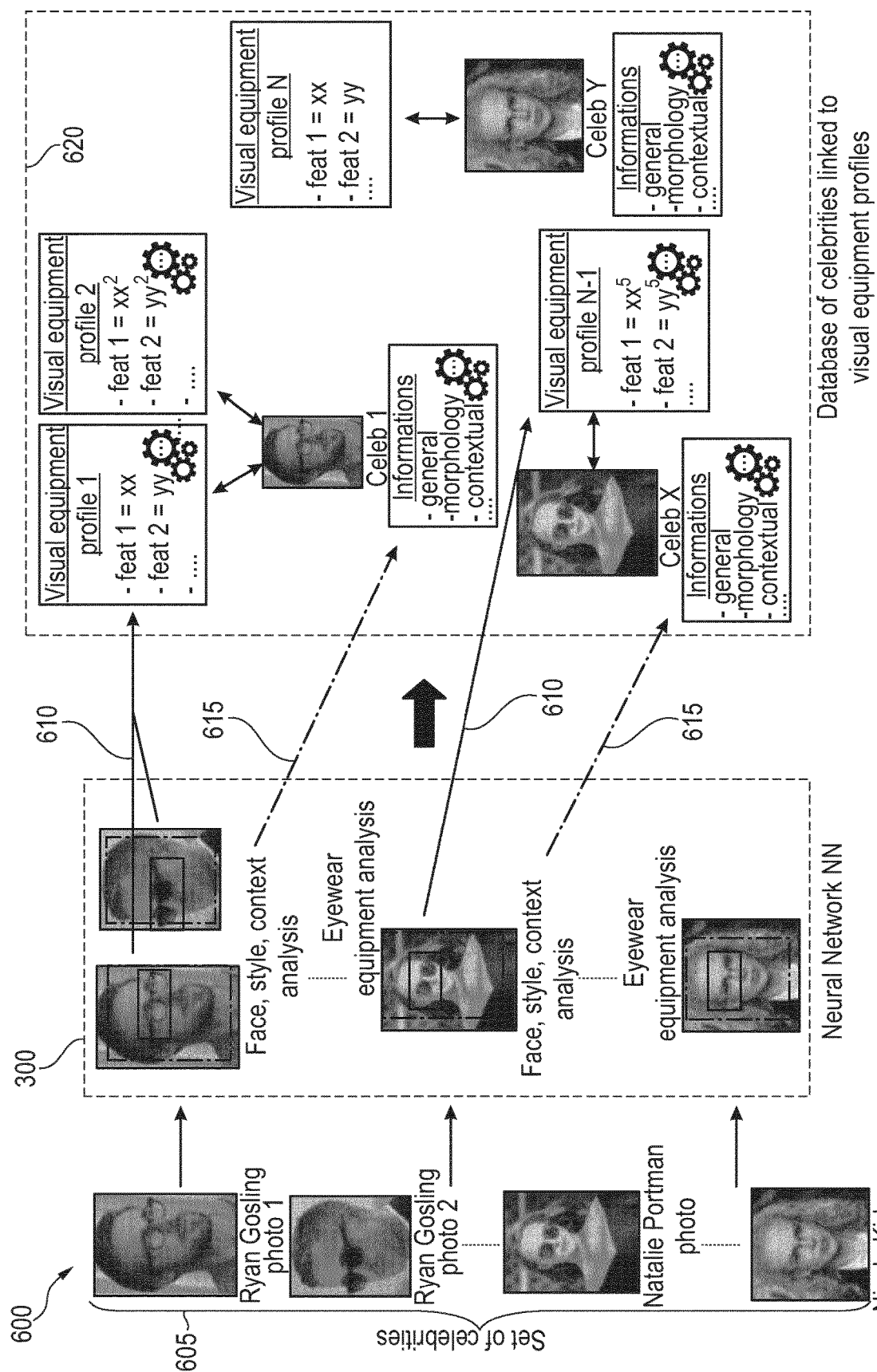
FIG. 6 illustrates an exemplary workflow where an eyewear equipment profile can be associated with a specific celebrity according to one or more aspects of the disclosed subject matter.

FIG. 6 illustrates an exemplary workflow 600 where an eyewear equipment profile can be associated with a specific celebrity according to one or more aspects of the disclosed subject matter. To automatically attract the consumer by advising the consumer of the opinion of the specific celebrity, the server 110 can be configured to define a set of specific celebrities 605 considered as trend setters. Determining whether a celebrity is a trend setter can done using objective criteria including a number of followers and/or friends on social media platforms, for example. Next, the server 110 can be configured to build a database (e.g., the database 140) of open-source images/videos concerning the set of specific celebrities 605, which can come from one or more of public social media profiles, community reviews, fashion magazines, and the like. Using the set of specific celebrities 605 as input, eyewear equipment can be associated to each celebrity by applying the neural network 300 to the set of specific celebrities 605. Generally, the neural network 300 can perform a face analysis, style analysis, context analysis, eyewear equipment analysis, etc. For example, the server 110 can be configured to run the neural network 300 on each image/video that makes up the set of specific celebrities 605 to determine information about the celebrity based on the image/video (e.g., gender, age approximation, hair color, eye color, skin color, etc.), a context of the celebrity including what the celebrity does and where the celebrity is (e.g., outdoors, indoors, at the beach, commuting, etc.), a style of the celebrity (e.g., glamour, chic, strict, etc.), clothes and accessories worn by the celebrity (e.g., hats, jewelry, makeup, clothes, handbags, shoes) including a type, color, shape, brand, pattern, texture, product category, details, and features, and attributes of the eyewear equipment worn by the celebrity including a shape, material, colors, texture, thickness, iconic brands, and the like. Then, each celebrity can be associated with one or more lists of eyewear equipment attributes. For example, because the identity of the celebrity can be known, each celebrity can be linked with one or more lists of eyewear equipment attributes. For example, the output of the neural network 300 corresponding to the face, style, and context analysis can be fed to information corresponding to a specific celebrity (e.g., as shown by arrows 615), and the output of the neural network 300 corresponding to the eyewear equipment analysis can be fed to an eyewear equipment profile corresponding to that celebrity (as shown by arrows 610). As a result, the output of the neural network 300 can be a database of celebrities linked to visual equipment profiles 620. The database of celebrities linked to visual equipment profiles 620 can be one of the one or more database 140, for example. More specifically, the database of celebrities linked to visual equipment profiles 620 can include morphological and contextual information about the celebrities and associated eyewear equipment attributes. The way the database 620 will be used depends on the use case, as shown in FIG. 7.

Figure 7:
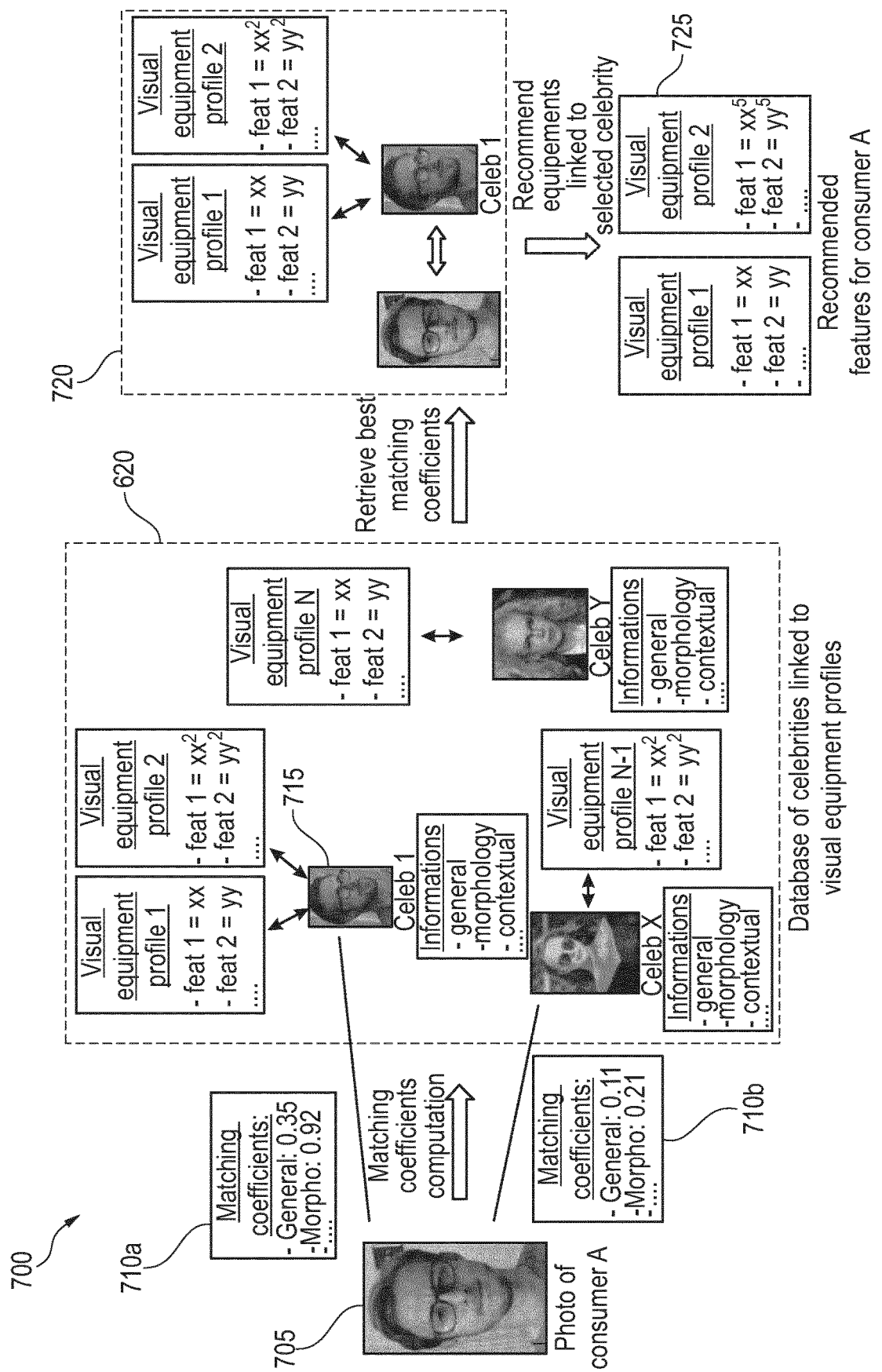
FIG. 7 illustrates an exemplary work flow for automatically attracting the consumer by advising the consumer of the opinion of a specific celebrity according to one or more aspects of the disclosed subject matter.

FIG. 7 illustrates an exemplary work flow 700 for automatically attracting the consumer by advising the consumer of the opinion of a specific celebrity according to one or more aspects of the disclosed subject matter. For example, in the use case that the consumer is being alerted that the consumer's morphology is similar to a specific celebrity, the server 110 can be configured to recommend one or more eyewear equipment similar to what the specific celebrity currently wears. The server 110 can receive one or more photos and/or videos (e.g., consumer photo 705) of the consumer wearing eyewear equipment or not. The one or more photos and/or videos can include photos and/or videos of the consumer's face and/or the consumer's entire body. The neural network (e.g., the neural network 300) can be used to compute information from the consumer photo 705 including information about the consumer based on the image/video (e.g., gender, age approximation, hair color, eye color, skin color, etc.), a context of the consumer including what the celebrity does and where the celebrity is (e.g., outdoors, indoors, at the beach, commuting, etc.), a style of the consumer (e.g., glamour, chic, strict, etc.), clothes and accessories worn by the consumer (e.g., hats, jewelry, makeup, clothes, handbags, shoes) including a type, color, shape, brand, pattern, texture, product category, details, and features, and attributes of the eyewear equipment worn by the consumer including a shape, material, colors, texture, thickness, iconic brands, and the like. Additionally, the server 110 can be configured to browse the database 620 and compute one or more matching coefficients (e.g., matching coefficients 710*a*, 710*b*) of the consumer to each celebrity with respect to the information identified about the consumer based on the output from the neural network 300 based on using the consumer photo 705 as input.

For example, a matching coefficient can be computed for each criteria category including general information (e.g., gender, age, ethnicity, etc.), morphological information (e.g., face shape, hair color, etc.), contextual information (e.g., location, activity), style information, clothes, accessories information (e.g., beautifier accessories), and the like. For example, matching coefficients 710*a* has a high morphological coefficient (e.g., morphological coefficient is 0.92) with celebrity 715, which can indicate a strong match. For each category, the server 110 can be configured to find the celebrities that have the highest matching coefficients with the consumer, and retrieve the visual equipment(s) attributes linked to each corresponding celebrity. Accordingly, match 720 can correspond to the consumer having the best match with celebrity 715, and the eyewear equipment profiles associated with the celebrity 715 can be linked with the consumer. Subsequently, the server 110 can be configured to output recommendation 725, which corresponds to recommending one or more eyewear equipment features for the consumer based on the match 720.

Additionally, the recommendation 725 can include additional alerts to further attract the consumer. A first example includes outputting either as the recommendation or along with the recommendation, "Wow! Did you notice that you looked like Ryan Gosling. He currently wears these frames. What do you think of them?" The alert can further include one or more of a photo of Ryan Gosling and a photo of the frames that the recommendation is referring to. As a second example, the recommendation can include, "Hey! You seem to like gothic look, like Madonna. She was recently seen with these sunglasses. What do you think of them?" The alert can further include one or more of a photo of Madonna and a photo of the sunglasses that the recommendation is referring to. As a third example, the recommendation can include, "Hey! You seem to appreciate big earrings, like Beyonce. She was also wearing them with these sunglasses. What do you think of them?" The alert can further include one or more of a photo of Beyonce and a photo of the sunglasses that the recommendation is referring to.

Regarding a second use case corresponding to alerting the consumer that a specific celebrity wears eyewear equipment similar to eyewear equipment that the consumer is currently browsing, for example, the input can include attributes of specific eyewear equipment (e.g., the eyewear equipment that the consumer is currently browsing). The server 110 can be configured to browse the database 620 and compute a matching coefficient of the eyewear equipment that the consumer was browsing to the eyewear equipment in the database 620. Additionally, the server 110 can be configured to find the eyewear equipment that has the highest matching coefficients with the eyewear equipment the consumer was browsing, and retrieve the celebrities associated with the eyewear equipment from the database 620. Based on the finding the eyewear equipment that best matches the eyewear equipment of the celebrities in the database 620, the server 110 can be configured to alert the consumer that retrieved celebrities recently wore eyewear equipment similar to the eyewear equipment that the consumer is currently browsing. For example, the alert can include "Did you know that Eva Longoria currently wears very similar frames to the ones you are currently trying?"

Figure 8:
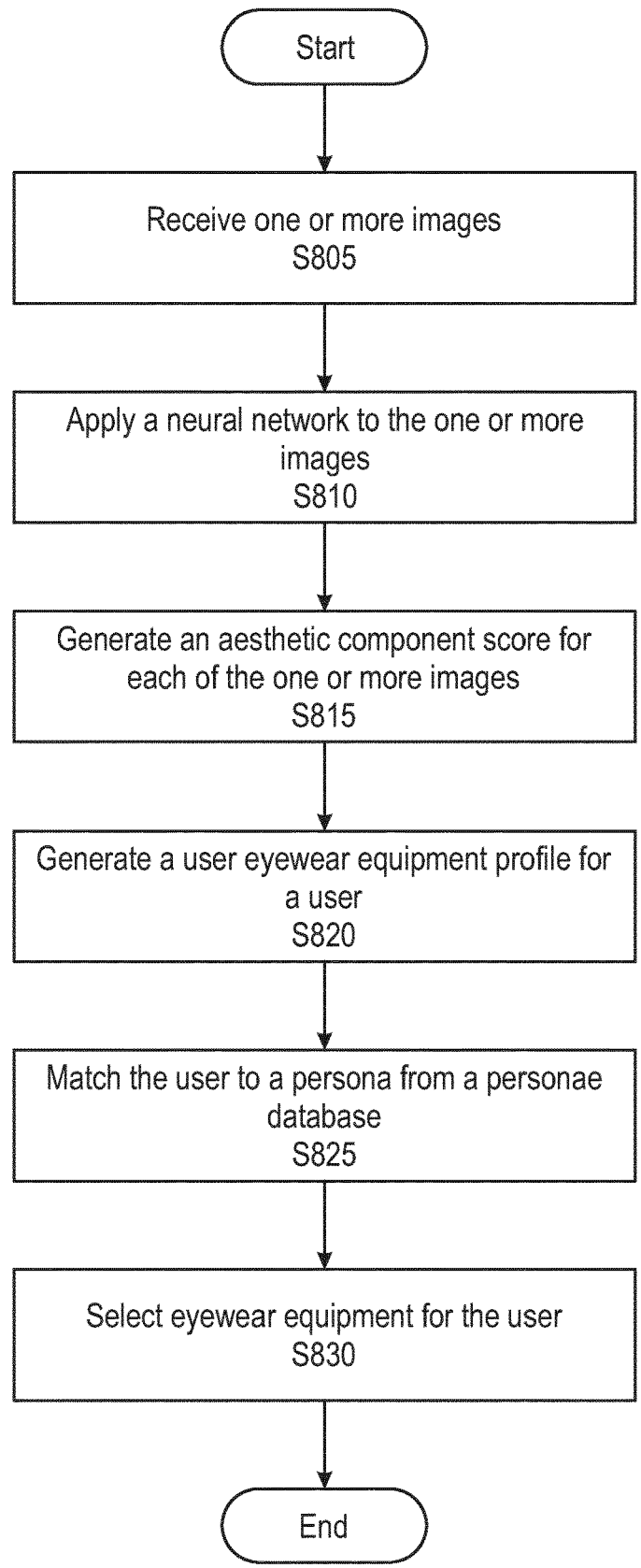
FIG. 8 illustrates an algorithmic flow chart of a method for selecting eyewear equipment according to one or more aspects of the disclosed subject matter.

FIG. 8 illustrates an algorithmic flow chart of a method for selecting eyewear equipment according to one or more aspects of the disclosed subject matter.

In S805, the server 110 can receive one or more images. The one or more images can include one or more people. For example, the one or more images can be a pool of open-source images/videos concerning anybody or a panel of pre-selected celebrities or trend setters as further described herein. Additionally, the one or more images received can be of a consumer.

In S810, a neural network (e.g., the neural network 300) can be applied to the one or more images. The neural network 300 can classify at least one aesthetic component of each image of the one or more images.

In S815, the server 110 can generate an aesthetic component score for each of the one or more images. For example, the aesthetic component score can be based on a number of appearances of an aesthetic component. Additionally, the aesthetic component score may be calculated to take into account a weight of the aesthetic component (e.g., if an aesthetic component is consider more relevant to fashion, it may have a higher weight).

In S820, the server 110 can generate a user eyewear equipment profile for a user. For example, the user can be matched to a persona from a personae database (e.g., database 440).

In S825, the server 110 can match the user to a persona from the personae database. In other words, each persona in the personae database can be linked to one or more persona eyewear equipment profiles. Then the user can be linked to the eyewear equipment profile of the persona that most closely matches the user. Additionally, the one or more persona eyewear equipment profiles can be based on the aesthetic component score.

In S830, the server 110 can be configured to select eyewear equipment for the user based on the user eyewear equipment profile. After selecting eyewear equipment for the user, the process can end.

Figure 9:
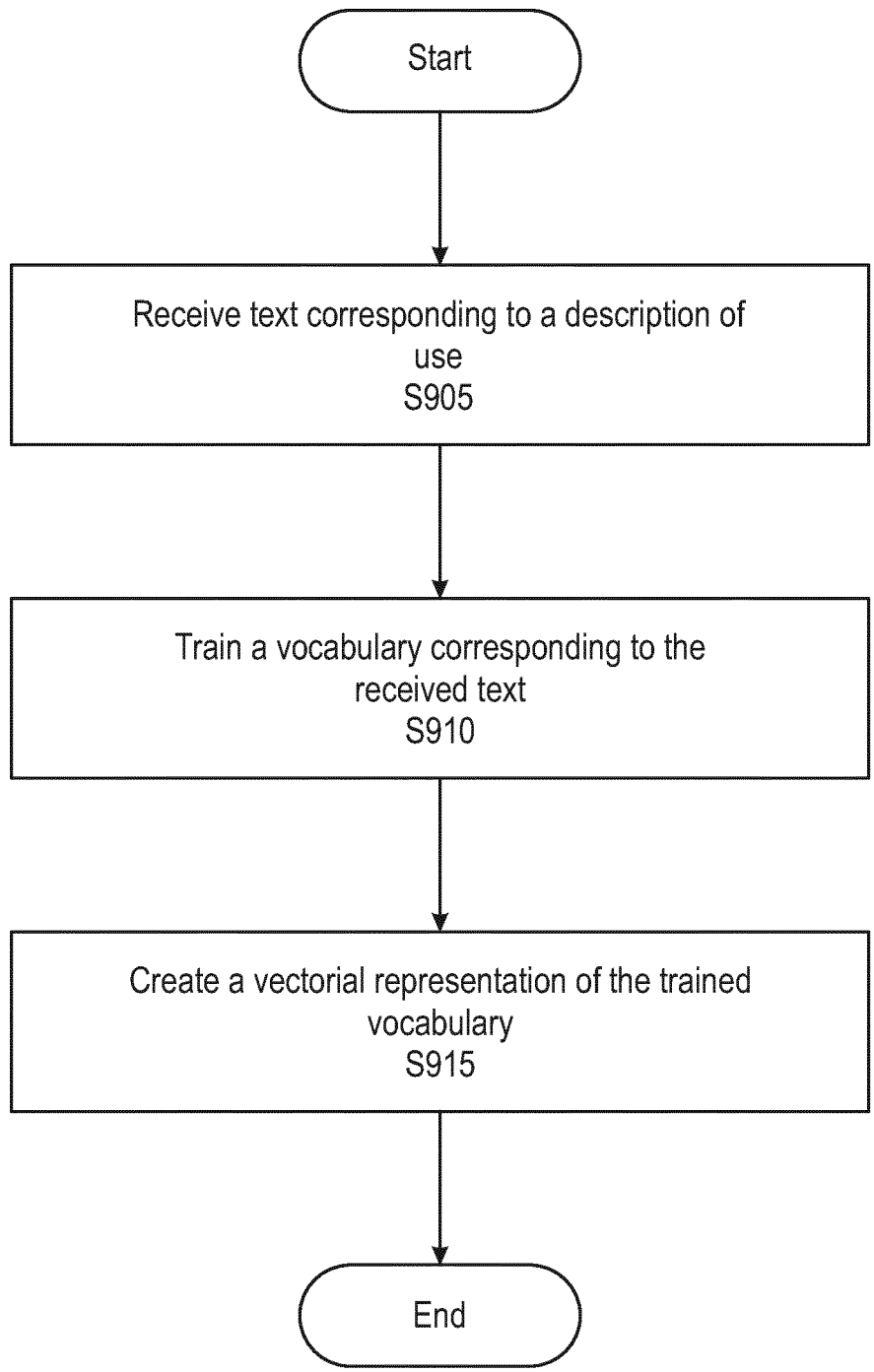
FIG. 9 is an algorithmic flow chart of a method for creating a vectorial representation of a training vocabulary according to one or more aspects of the disclosed subject matter.

FIG. 9 is an algorithmic flow chart of a method for creating a vectorial representation of a training vocabulary according to one or more aspects of the disclosed subject matter.

In S905, the server 110 can receive text corresponding to a description of use.

In S910, the server 110 can train a vocabulary corresponding to the received text.

In S915, the server 110 can create a vectorial representation of the trained vocabulary using word2vec, for example. After creating the vectorial representation of the trained vocabulary, the process can end.

Figure 10:
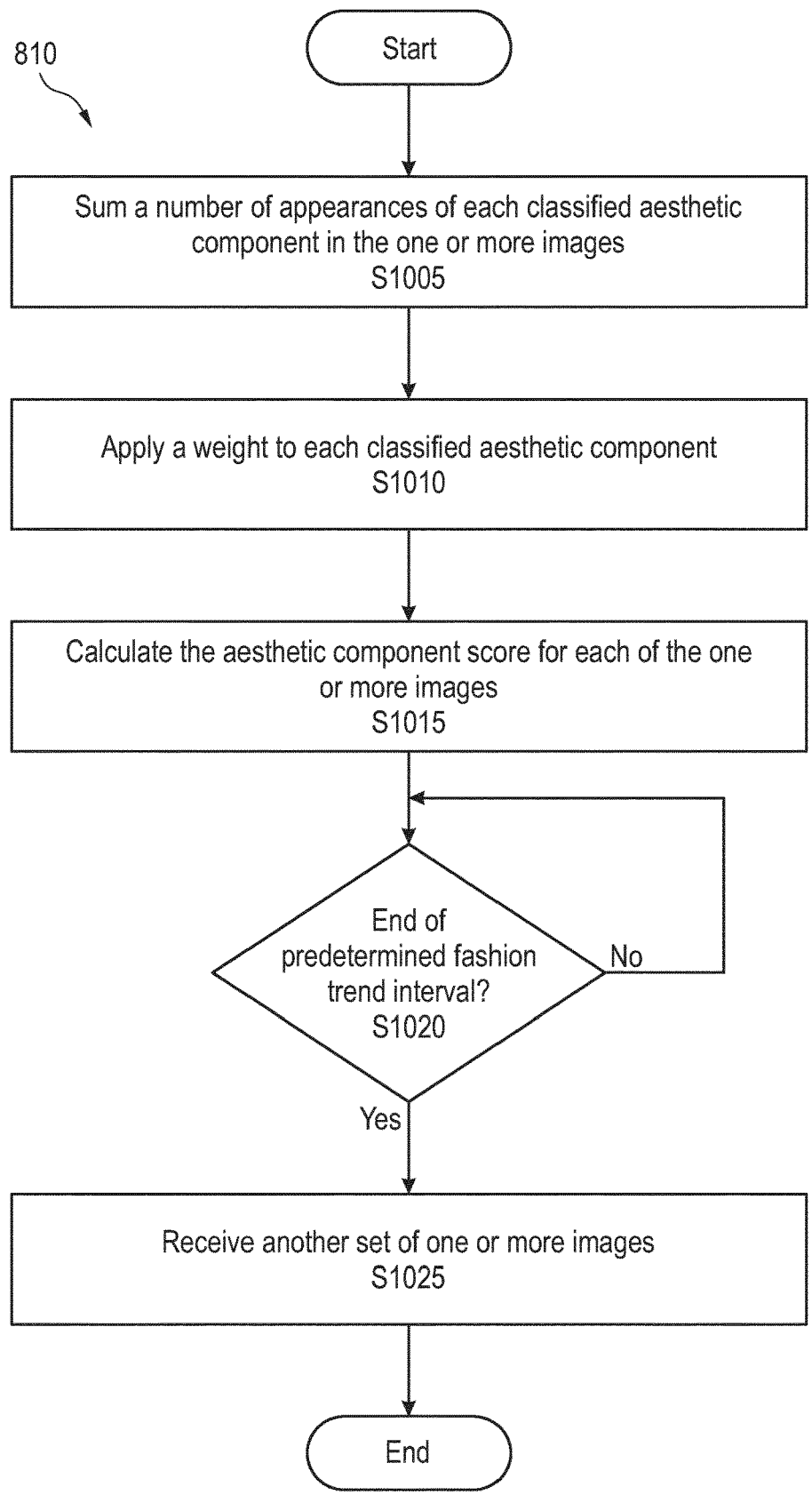
FIG. 10 is an algorithmic flow chart of a method for applying the neural network to the one or more images according to one or more aspects of the disclosed subject matter.

FIG. 10 is an algorithmic flow chart of a method for applying the neural network to the one or more images according to one or more aspects of the disclosed subject matter. In FIG. 10, steps 1005-1025 can correspond to S810.

In S1005, the server 110 can be configured to sum a number of appearances of each classified aesthetic component in the one or more images.

In S1010, the server 110 can apply a weight to each classified aesthetic component. For example, the number of appearances of each classified aesthetic component can be weighed as a function of predetermined criteria including a time when an image the item appears in was released, a time period when all the plurality of images including the item were released, a person that provided the image, and feedback of other people regarding the image including social media engagement.

In S1015, the server 110 can calculate the aesthetic component score for each of the one or more images based on how frequently each aesthetic component appeared in the one or more images.

In S1020, the server 110 can determine whether an end of a predetermined fashion interval has been reached. For example, a predetermined fashion interval can be six months based on fashion trends. If it is determined that the end of a fashion trend interval has not been reached, the process can continue checking if the end of the predetermined fashion interval has been reached in S1020. However, in response to a determination that the end of the fashion trend interval has been reached, the server 110 can receive another set of one or more images in S1025.

In S1025, the server 110 can receive another set of one or more images when the end of the fashion interval has been reached. After receiving the another set of one or more images, the process can end.

Figure 11:
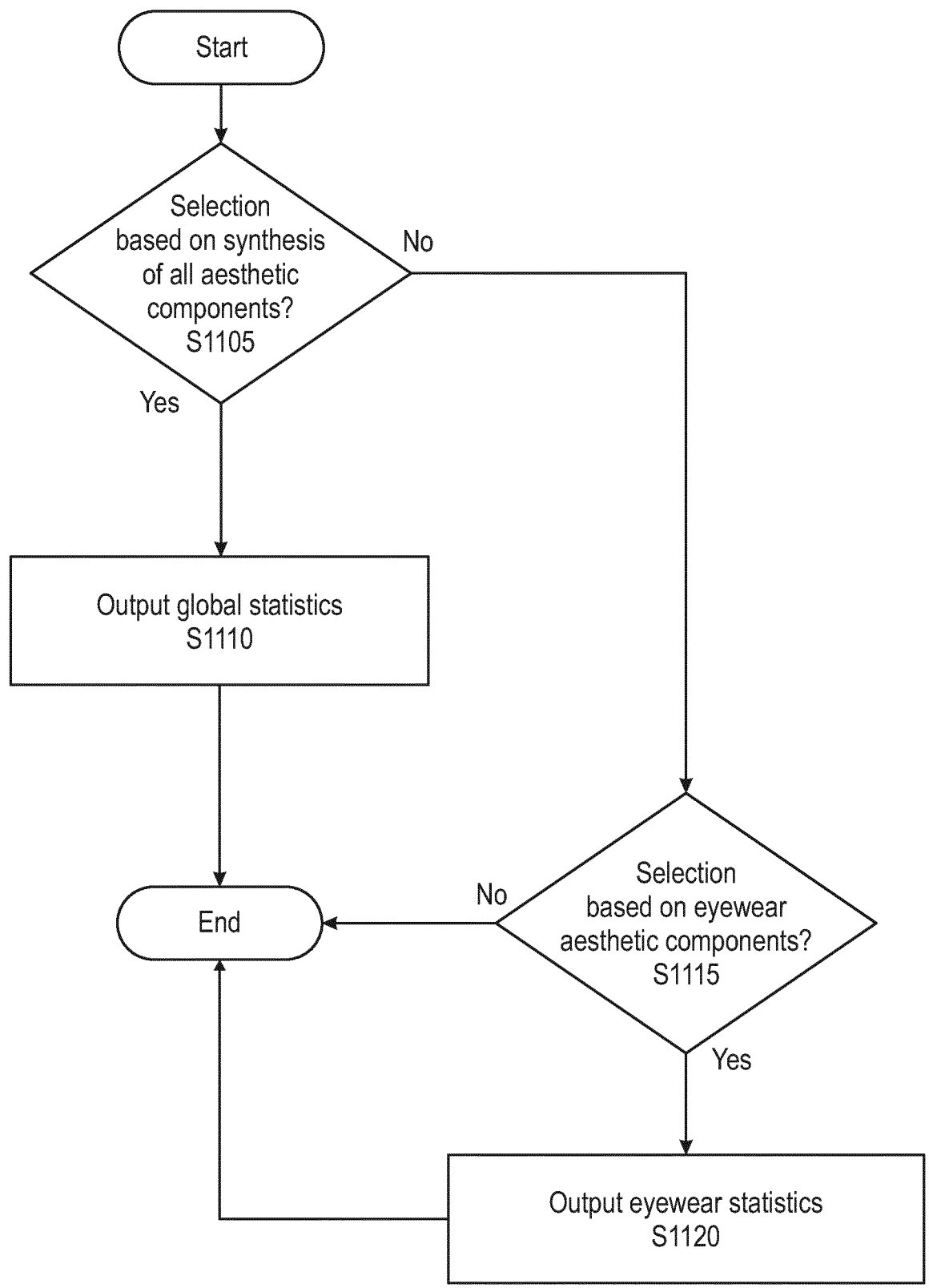
FIG. 11 is an algorithmic flow chart of a method for determining which statistics to output based on a use case according to one or more aspects of the disclosed subject matter.

FIG. 11 is an algorithmic flow chart of a method for determining which statistics to output based on a use case according to one or more aspects of the disclosed subject matter.

In S1105, the server 110 can be configured to determine whether a user has requested a recommendation for eyewear equipment based on a synthesis of all aesthetic components. In response to a determination that the user has requested the recommendation for eyewear equipment based on the synthesis of all aesthetic components, global statistics can be output in S1110. The global statistics can be based on the trend level of all the aesthetic components, for example, as has been described herein. After the outputting the global statistics, the process can end.

However, in response to a determination that the user has not requested the recommendation for eyewear equipment based on the synthesis of all aesthetic components, the server 110 can be configured to determine whether the user has requested an eyewear equipment recommendation based on eyewear aesthetic components in S1115.

In S1115, in response to the determination that the user did not request the eyewear recommendation based on eyewear aesthetic components, the process can end. However, in response to the determination that the user requested the eyewear equipment recommendation based on the eyewear aesthetic components, the server 110 can output eyewear statistics in S1120. The eyewear statistics can be based on the aesthetic features of the eyewear identified in the one or more received images, for example. After outputting the eyewear statistics, the process can end.

Figure 12:
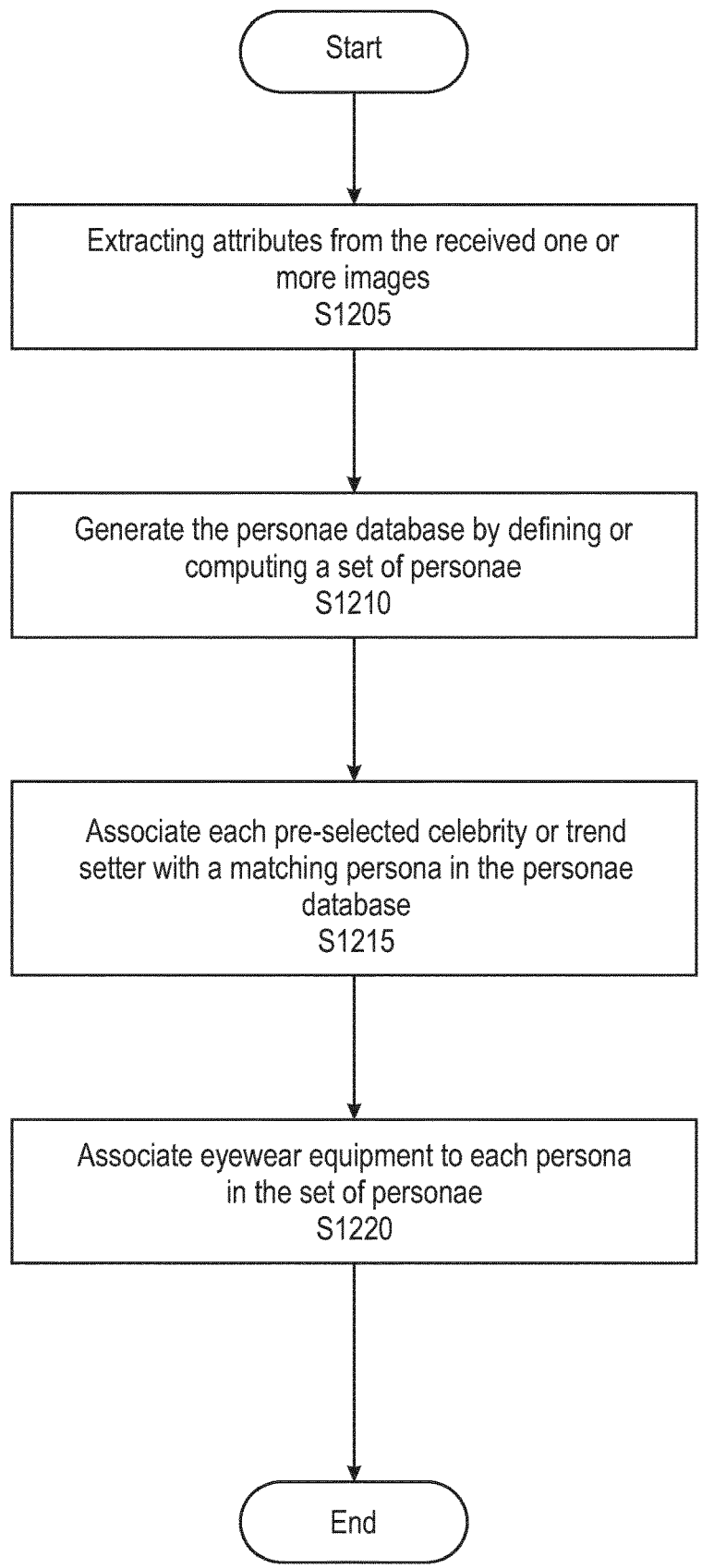
FIG. 12 is an algorithmic flow chart of a method for associating eyewear equipment to a persona according to one or more aspects of the disclosed subject matter.

FIG. 12 is an algorithmic flow chart of a method for associating eyewear equipment to a persona according to one or more aspects of the disclosed subject matter.

In S1205, the server 110 can be configured to extract attributes from the received one or more images. For example, the one or more images can be from publically available media corresponding to a panel of pre-selected celebrities or trend setters.

In S1210, the server 110 can generate the personae database by defining or computing a set of personae. For example, each persona in the personae database can have a human typical profile. The human typical profile can be based on physical and context characteristics of the people in the one or more images, which can be identified by having applied the neural network 300 to the one or more images.

In S1215, the server 110 can associate each pre-selected celebrity or trend setter with a matching persona in the personae database. The association can be based on physical and context characteristics of the pre-selected celebrity or trend setter. In other words, the pre-selected celebrity or trend setter is associated with a human typical persona that most closely matches the look of the celebrity or trend setter.

In S1220, the server 110 can associate eyewear equipment to each persona in the set of personae based on the aesthetic component score of the eyewear equipment of the pre-selected celebrities or trend setters. For example, the associated eyewear equipment can correspond to the one or more persona eyewear equipment profiles. In other words, each persona in the set of personae can be linked to specific eyewear equipment and or eyewear equipment features. After associated eyewear equipment to each persona in the set of personae, the process can end.

Figure 13:
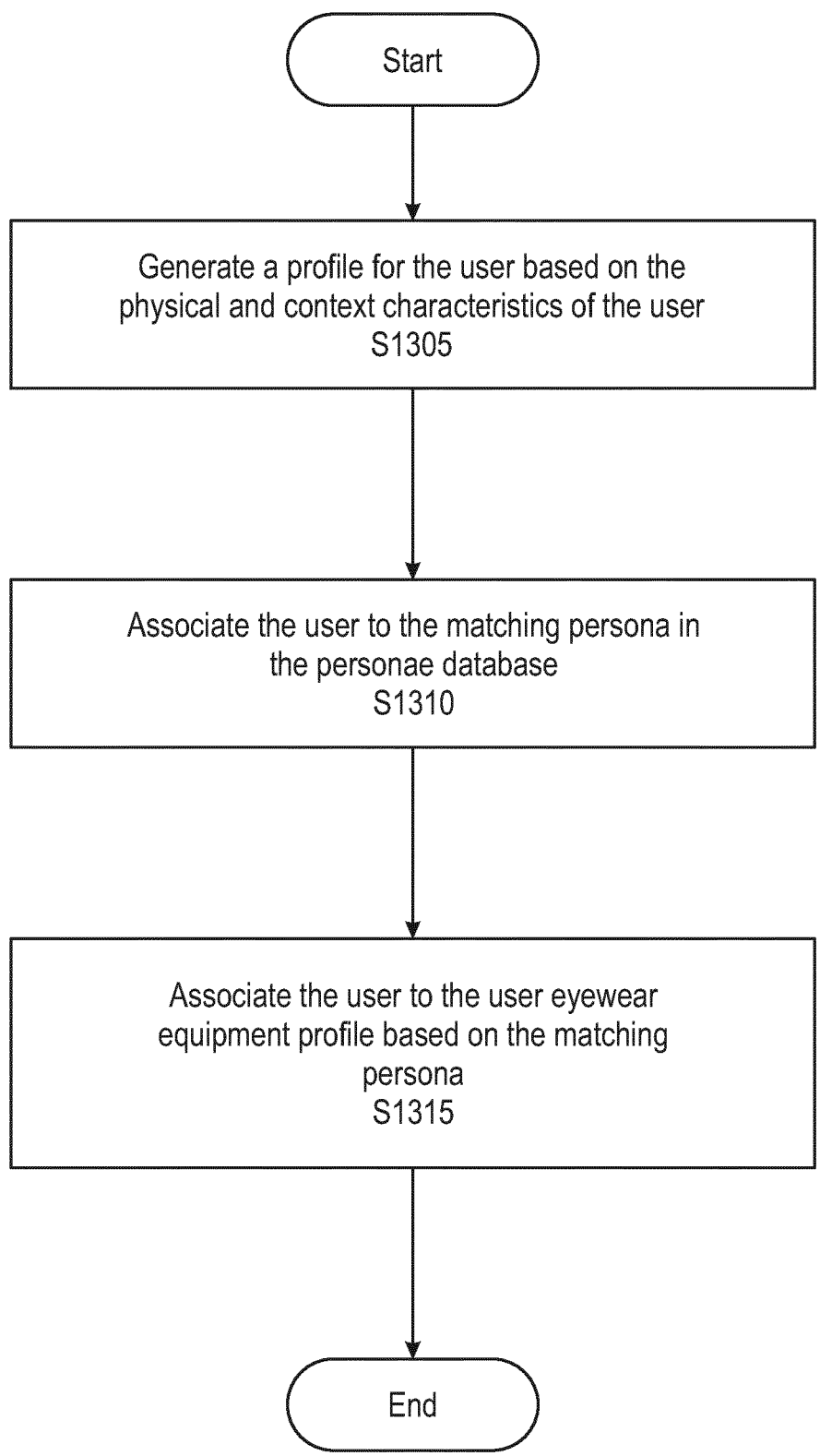
FIG. 13 illustrates an algorithmic flow chart of a method for associating the user with an eyewear equipment profile according to one or more aspects of the disclosed subject matter.

FIG. 13 illustrates an algorithmic flow chart of a method for associating the user with an eyewear equipment profile according to one or more aspects of the disclosed subject matter.

In S1305, the server 110 can generate a profile for the user based on the physical and context characteristics of the user. The server can generate the profile in response the received one or more images being one or more images of the user, for example.

In S1310, the server 110 can associate the user to the matching persona in the personae database that most closely matches the profile generated for the user based on the physical and context characteristics of the user.

In S1315, the server 110 can associate the user to the user eyewear equipment profile based on the matching persona. For example, the user eyewear equipment profile can be based on the one or more persona eyewear equipment profiles of the matching persona. In other words, the user can be associated with a persona that most closely matches the user, and then the eyewear equipment linked with the persona can be linked with the user. After associating the user to the user eyewear equipment profile based on the matching persona, the process can end.

In the above description of FIGS. 8-13, any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

The system 100 includes several advantages including more precise eyewear equipment recommendations to consumers. Additionally, the recommendation can include an increased level of confidence for the consumer because the eyewear equipment will be trendy and also be a good match for the consumer's style. Accordingly, the recommendation can be much more specifically targeted toward the user. Further, the eyewear equipment can be matched to the consumer based on what celebrities and trend setters are currently wearing, as well as the overall trends in addition to eyewear specific trends. As a result, the technical problem of effectively selecting eyewear equipment for a consumer can be solved by the technical solution of automatically selecting eyewear equipment for a user using a neural network to analyze fashion trends and recommend that eyewear equipment to that user based on matching the user to a persona linked to specific eyewear equipment, which can then be linked to that user.

Figure 14:
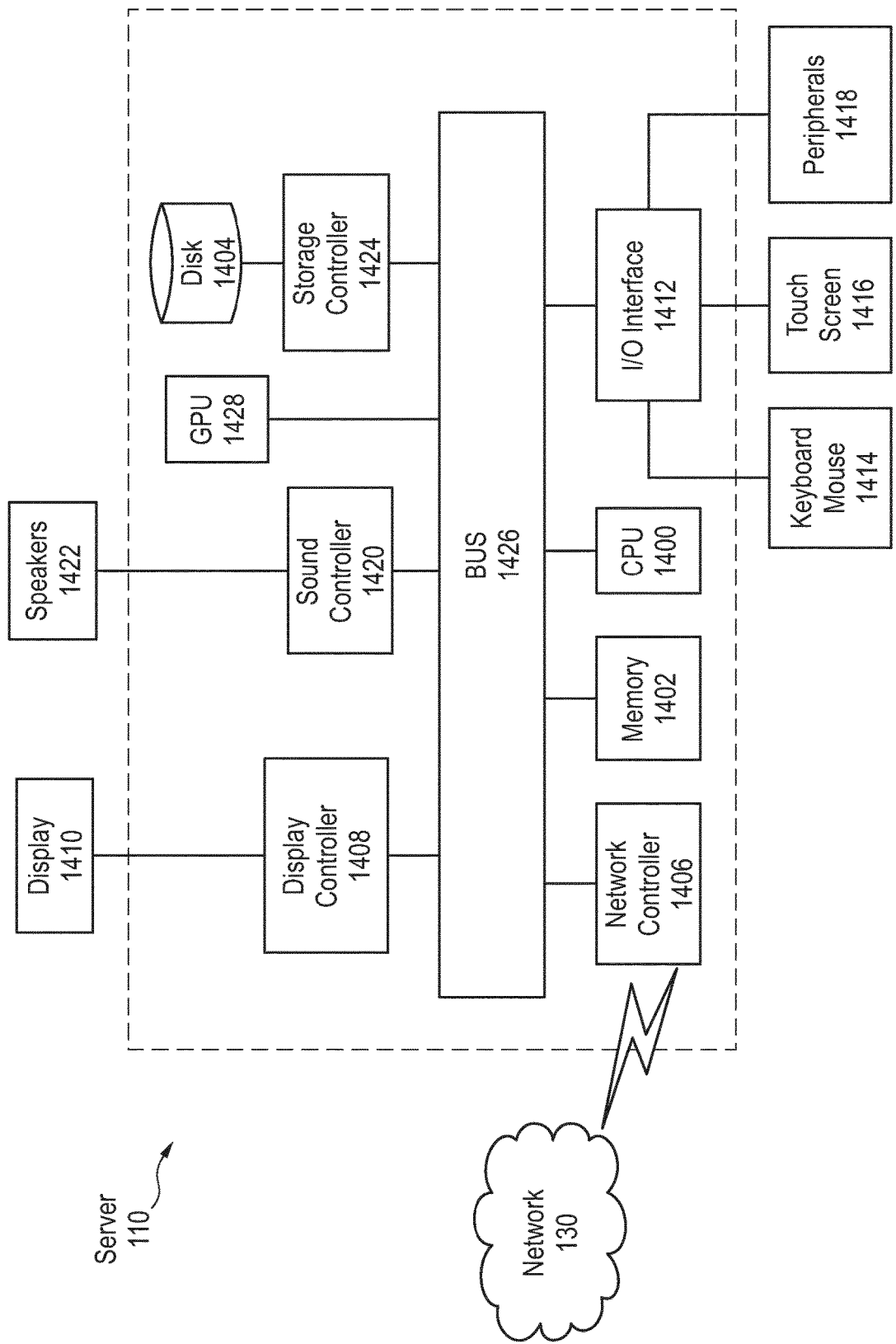
FIG. 14 is a hardware block diagram of a server according to one or more exemplary aspects of the disclosed subject matter.

Next, a hardware description of a server 110 according to exemplary embodiments is described with reference to FIG. 14. The hardware description described herein can also be a hardware description of the remote device 120 and/or the processing circuitry. In FIG. 14, the server 110 includes a CPU 1400 which performs one or more of the processes described above/below. The process data and instructions may be stored in memory 1402. These processes and instructions may also be stored on a storage medium disk 1404 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 110 communicates, such as a server or computer. Additionally, a Graphics Processing Unit (GPU) 1428 such as NVIDIA GeFroce RTX 2080 Ti can handle some or all of the neural network processing, for example.

Further, the claimed advancements may be provided as a utility application, background daemon, or component of an operating system, or combination thereof, executing in conjunction with CPU 1400 and an operating system such as Microsoft Windows, UNIX, Solaris, LINUX, Apple MAC-OS and other systems known to those skilled in the art.

The hardware elements in order to achieve the server 110 may be realized by various circuitry elements. Further, each of the functions of the above described embodiments may be implemented by circuitry, which includes one or more processing circuits. A processing circuit includes a particularly programmed processor, for example, processor (CPU) 1400, as shown in FIG. 14. A processing circuit also includes devices such as an application specific integrated circuit (ASIC) and conventional circuit components arranged to perform the recited functions.

In FIG. 14, the server 110 includes a CPU 1400 which performs the processes described above. The server 110 may be a general-purpose computer or a particular, special-purpose machine. In one embodiment, the server 110 becomes a particular, special-purpose machine when the processor 1400 is programmed to perform eyewear equipment selection (and in particular, any of the processes discussed with reference to FIGS. 8-13).

Alternatively, or additionally, the CPU 1400 may be implemented on an FPGA, ASIC, PLD or using discrete logic circuits, as one of ordinary skill in the art would recognize. Further, CPU 1400 may be implemented as multiple processors cooperatively working in parallel to perform the instructions of the inventive processes described above.

The server 110 in FIG. 14 also includes a network controller 1406, such as an Intel Ethernet PRO network interface card from Intel Corporation of America, for interfacing with network 130. As can be appreciated, the network 130 can be a public network, such as the Internet, or a private network such as an LAN or WAN network, or any combination thereof and can also include PSTN or ISDN sub-networks. The network 130 can also be wired, such as an Ethernet network, or can be wireless such as a cellular network including EDGE, 3G and 4G wireless cellular systems. The wireless network can also be WiFi, Bluetooth, or any other wireless form of communication that is known.

The server 110 further includes a display controller 1408, such as a graphics card or graphics adaptor for interfacing with display 1410, such as a monitor. A general purpose I/O interface 1412 interfaces with a keyboard and/or mouse 1414 as well as a touch screen panel 1416 on or separate from display 1410. General purpose I/O interface also connects to a variety of peripherals 1418 including printers and scanners.

A sound controller 1420 is also provided in the server 110 to interface with speakers/microphone 1422 thereby providing sounds and/or music.

The general purpose storage controller 1424 connects the storage medium disk 1404 with communication bus 1426, which may be an ISA, EISA, VESA, PCI, or similar, for interconnecting all of the components of the server 110. A description of the general features and functionality of the display 1410, keyboard and/or mouse 1414, as well as the display controller 1408, storage controller 1424, network controller 1406, sound controller 1420, and general purpose I/O interface 1412 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

Embodiments of the present disclosure may also be as set forth in the following parentheticals.

(1) A server comprising processing circuitry configured to receive one or more images, the one or more images including one or more representations of people, apply a neural network to the one or more images wherein the neural network classifies at least one aesthetic component of each image of the one or more images, an aesthetic component score being generated for each image in the one or more images, generate a user eyewear equipment profile for a user, the user being matched to a persona from a personae database, each persona in the personae database being linked to one or more persona eyewear equipment profiles, the one or more persona eyewear equipment profiles being based on the aesthetic component score, and select eyewear equipment for the user based on the generated user eyewear equipment profile.

(2) The server according to (1), wherein the processing circuitry is further configured to sum a number of appearances of each classified aesthetic component in the one or more images, wherein the number of appearances is weighed as a function of predetermined criteria including one or more of a time when an image the item appears in was released, a time period when all the plurality of images including the item were released, a person that provided the image, and feedback of other people regarding the image including social media engagement, and calculate the aesthetic component score for each of the one or more images based on how frequently each aesthetic component appeared in the one or more images, wherein each aesthetic component is weighted based on one or more predetermined criteria and each aesthetic component in each of the one or more images is combined to calculate aesthetic component statistics for the one or more images.

(3) The server according to (1) or (2), wherein the processing circuitry is further configured to determine whether the eyewear equipment selection for the user is based on a synthesis of all aesthetic components in the one or more images, output global statistics in response to a determination that the eyewear equipment selection for the user is based on the attribute of all aesthetic components in the one or more images, the global statistics being based on the aesthetic component score, determine whether the eyewear equipment selection for the user is based on eyewear aesthetic components in the one or more images, and output eyewear statistics in response to a determination that the eyewear equipment selection for the user is based on eyewear aesthetic components in the one or more images, the eyewear statistics being based on the aesthetic component score, wherein the aesthetic component score is only incorporated into the global statistics and the eyewear statistics when the aesthetic component score is greater than a predetermined minimum aesthetic component score.

(4) The server according to any of (1) to (3), wherein in response to the received one or more images being from publically available media corresponding to a panel of pre-selected celebrities or trend setters, the processing circuitry is further configured to generate the personae database by defining or computing a set of personae, each persona in the personae database having a human typical profile, the human typical profile being based on physical and context characteristics of the people in the one or more images, associate each pre-selected celebrity or trend setter with a matching persona in the personae database, the association being based on physical and context characteristics of the pre-selected celebrity or trend setter, and associate eyewear equipment to each persona in the set of personae based on the aesthetic component score of the eyewear equipment of the pre-selected celebrities or trend setters, the associated eyewear equipment to each persona corresponding to the one or more persona eyewear equipment profiles.

(5) The server according to any of (1) to (4), wherein in response to the received one or more images being one or more images of the user, the processing circuitry is further configured to generate a profile for the user based on the physical and context characteristics of the user, associate the user to the matching persona in the personae database that most closely matches the profile generated for the user based on the physical and context characteristics of the user, and associate the user to the user eyewear equipment profile based on the matching persona, the user eyewear equipment profile being based on the one or persona eyewear equipment profiles of the matching persona.

(6) The server according to any of (1) to (5), wherein the processing circuitry is further configured to receive text, the text corresponding to a description of a use, train a vocabulary corresponding to the received text, and create a vectorial representation of the trained vocabulary.

(7) The server according to any of (1) to (6), wherein the at least one aesthetic component includes attributes of the one or more people, context attributes, and eyewear attributes.

(8) The server according to any of (1) to (7), wherein the selected eyewear equipment is selected based on eyewear equipment available in a predetermined retailer catalogue.

(9) The server according to any of (1) to (8), wherein generating the personae database by computing the set of personae includes extracting attributes from the received one or more images to build the personae database based on the publically available media corresponding to the panel of pre-selected celebrities or trend setters.

(10) The server according to any of (1) to (9), wherein a new personae database is generated at predetermined intervals, the predetermined intervals corresponding to known fashion trend change frequency.

(11) The server according to any of (1) to (10), wherein the aesthetic component score is based on a plurality of open-source images from one or more of a social media profile, community review, and fashion magazines, the plurality of open-source images corresponding to one or more pre-selected celebrities or trend setters.

(12) The server according to any of (1) to (11), wherein the processing circuitry for generating the aesthetic component score is further configured to receive the plurality of open-source images recurrently based on a trend change frequency in the fashion industry, and calculate a score for each of the plurality of open-source images based on a trend level, the trend level being based on a number of occurrences of an item in the plurality of open-source images, the item including one or more of a type, color, shape, product, pattern, brand, and product category.

(13) The server according to any of (1) to (12), wherein the score is weighted as a function of predetermined criteria including a time when an image the item appears in was released, a time period when all the plurality of images including the item were released, a person that provided the image, and feedback of other people regarding the image including social media engagement.

(14) The server according to any of (1) to (13), wherein the score is further weighted based on previous scores of the same aesthetic component from previous intervals.

(15) A method for selecting eyewear equipment, comprising receiving, by processing circuitry, one or more images, the one or more images including one or more representations of people; applying, by the processing circuitry, a neural network to the one or more images wherein the neural network classifies at least one aesthetic component of each image of the one or more images, an aesthetic component score being generated for each image in the one or more images; generating, by the processing circuitry, a user eyewear equipment profile for a user, the user being matched to a persona from a personae database, each persona in the personae database being linked to one or more persona eyewear equipment profiles, the one or more persona eyewear equipment profiles being based on the aesthetic component score; and selecting, by the processing circuitry, eyewear equipment for the user based on the generated user eyewear equipment profile.

(16) The method according to (15), further comprising summing a number of appearances of each classified aesthetic component in the one or more images, wherein the number of appearances is weighed as a function of predetermined criteria including one or more of a time when an image the item appears in was released, a time period when all the plurality of images including the item were released, a person that provided the image, and feedback of other people regarding the image including social media engagement; and calculating the aesthetic component score for each of the one or more images based on how frequently each aesthetic component appeared in the one or more images, wherein each aesthetic component is weighted based on one or more predetermined criteria and each aesthetic component in each of the one or more images is combined to calculate aesthetic component statistics for the one or more images.

(17) The method according to (15) or (16), further comprising determining whether the eyewear equipment selection for the user is based on a synthesis of all aesthetic components in the one or more images; outputting global statistics in response to a determination that the eyewear equipment selection for the user is based on the attribute of all aesthetic components in the one or more images, the global statistics being based on the aesthetic component score; determining whether the eyewear equipment selection for the user is based on eyewear aesthetic components in the one or more images; and outputting eyewear statistics in response to a determination that the eyewear equipment selection for the user is based on eyewear aesthetic components in the one or more images, the eyewear statistics being based on the aesthetic component score, wherein the aesthetic component score is only incorporated into the global statistics and the eyewear statistics when the aesthetic component score is greater than a predetermined minimum aesthetic component score.

(18) The method according to any of (15) to (17), in response to the received one or more images being from publically available media corresponding to a panel of pre-selected celebrities or trend setters, further comprising generating the personae database by defining or computing a set of personae, each persona in the personae database having a human typical profile, the human typical profile being based on physical and context characteristics of the people in the one or more images; associating each pre-selected celebrity or trend setter with a matching persona in the personae database, the association being based on physical and context characteristics of the pre-selected celebrity or trend setter; and associating eyewear equipment to each persona in the set of personae based on the aesthetic component score of the eyewear equipment of the pre-selected celebrities or trend setters, the associated eyewear equipment to each persona corresponding to the one or more persona eyewear equipment profile.

(19) The method according to any of (15) to (18), in response to the received one or more images being one or more images of the user, further comprising generating a profile for the user based on the physical and context characteristics of the user; associating the user to the matching persona in the personae database that most closely matches the profile generated for the user based on the physical and context characteristics of the user; and associating the user to the user eyewear equipment profile based on the matching persona, the user eyewear equipment profile being based on the one or more persona eyewear equipment profiles of the matching persona.

(20) A non-transitory computer-readable storage medium storing computer-readable instructions thereon which, when executed by a computer, cause the computer to perform a method, the method comprising receiving one or more images, the one or more images including one or more representations of people, applying a neural network to the one or more images wherein the neural network classifies at least one aesthetic component of each image of the one or more images, an aesthetic component score being generated for each image in the one or more images, generating a user eyewear equipment profile for a user, the user being matched to a persona from a personae database, each persona in the personae database being linked to one or more persona eyewear equipment profiles, the one or more persona eyewear equipment profiles being based on the aesthetic component score, and selecting eyewear equipment for the user based on the generated user eyewear equipment profile.

(21) The non-transitory computer-readable storage medium according to (20), further comprising summing a number of appearances of each classified aesthetic component in the one or more images, wherein the number of appearances is weighed as a function of predetermined criteria including one or more of a time when an image the item appears in was released, a time period when all the plurality of images including the item were released, a person that provided the image, and feedback of other people regarding the image including social media engagement; and calculating the aesthetic component score for each of the one or more images based on how frequently each aesthetic component appeared in the one or more images, wherein each aesthetic component is weighted based on one or more predetermined criteria and each aesthetic component in each of the one or more images is combined to calculate aesthetic component statistics for the one or more images.

(22) The non-transitory computer-readable storage medium according to (20) or (21), further comprising determining whether the eyewear equipment selection for the user is based on a synthesis of all aesthetic components in the one or more images; outputting global statistics in response to a determination that the eyewear equipment selection for the user is based on the attribute of all aesthetic components in the one or more images, the global statistics being based on the aesthetic component score; determining whether the eyewear equipment selection for the user is based on eyewear aesthetic components in the one or more images; and outputting eyewear statistics in response to a determination that the eyewear equipment selection for the user is based on eyewear aesthetic components in the one or more images, the eyewear statistics being based on the aesthetic component score, wherein the aesthetic component score is only incorporated into the global statistics and the eyewear statistics when the aesthetic component score is greater than a predetermined minimum aesthetic component score.

(23) The non-transitory computer-readable storage medium according to any of (20) to (22), in response to the received one or more images being from publically available media corresponding to a panel of pre-selected celebrities or trend setters, further comprising generating the personae database by defining or computing a set of personae, each persona in the personae database having a human typical profile, the human typical profile being based on physical and context characteristics of the people in the one or more images; associating each pre-selected celebrity or trend setter with a matching persona in the personae database, the association being based on physical and context characteristics of the pre-selected celebrity or trend setter; and associating eyewear equipment to each persona in the set of personae based on the aesthetic component score of the eyewear equipment of the pre-selected celebrities or trend setters, the associated eyewear equipment to each persona corresponding to the one or more persona eyewear equipment profiles.

(24) The non-transitory computer-readable storage medium according to any of (20) to (23), in response to the received one or more images being one or more images of the user, further comprising generating a profile for the user based on the physical and context characteristics of the user; associating the user to the matching persona in the personae database that most closely matches the profile generated for the user based on the physical and context characteristics of the user; and associating the user to the user eyewear equipment profile based on the matching persona, the user eyewear equipment profile being based on the one or more persona eyewear equipment profiles of the matching persona.

The invention claimed is:

1. A server, comprising:
processing circuitry configured to
receive one or more images, the one or more images including one or more representations of people,
apply a neural network to the one or more images, wherein the neural network classifies at least one aesthetic component of each image of the one or more images, an aesthetic component score being generated for each image in the one or more images,
generate a user eyewear equipment profile for a user, the user being matched to a persona from a personae database, each persona in the personae database being linked to one or more persona eyewear equipment profiles, the one or more persona eyewear equipment profiles being based on the aesthetic component score, and
select eyewear equipment for the user based on the generated user eyewear equipment profile,
wherein the aesthetic component score is calculated based on a number of occurrences of an item including a type, a color, a shape, a product, a pattern, a brand, or a product category.

2. The server of claim 1, wherein the processing circuitry is further configured to
sum a number of appearances of each classified aesthetic component in the one or more images, wherein the number of appearances is weighed as a function of predetermined criteria including one or more of a time when an image the item appears in was released, a time period when all the plurality of images including the item were released, a person that provided the image, and feedback of other people regarding the image including social media engagement, and
calculate the aesthetic component score for each of the one or more images based on how frequently each aesthetic component appeared in the one or more images,
wherein each aesthetic component is weighted based on one or more predetermined criteria and each aesthetic component in each of the one or more images is combined to calculate aesthetic component statistics for the one or more images.

3. The server of claim 2, wherein the processing circuitry is further configured to
determine whether the eyewear equipment selection for the user is based on a synthesis of all aesthetic components in the one or more images,
output global statistics in response to a determination that the eyewear equipment selection for the user is based on the attribute of all aesthetic components in the one or more images, the global statistics being based on the aesthetic component score,
determine whether the eyewear equipment selection for the user is based on eyewear aesthetic components in the one or more images, and
output eyewear statistics in response to a determination that the eyewear equipment selection for the user is based on eyewear aesthetic components in the one or more images, the eyewear statistics being based on the aesthetic component score,
wherein the aesthetic component score is only incorporated into the global statistics and the eyewear statistics when the aesthetic component score is greater than a predetermined minimum aesthetic component score.

4. The server of claim 1, wherein in response to the received one or more images being from publically available media corresponding to a panel of pre-selected celebrities or trend setters, the processing circuitry is further configured to
generate the personae database by defining or computing a set of personae, each persona in the personae database having a human typical profile, the human typical profile being based on physical and context characteristics of the people in the one or more images,
associate each pre-selected celebrity or trend setter with a matching persona in the personae database, the association being based on physical and context characteristics of the pre-selected celebrity or trend setter, and
associate eyewear equipment to each persona in the set of personae based on the aesthetic component score of the eyewear equipment of the pre-selected celebrities or trend setters, the associated eyewear equipment to each persona corresponding to the one or more persona eyewear equipment profiles.

5. The server of claim 4, wherein in response to the received one or more images being one or more images of the user, the processing circuitry is further configured to
generate a profile for the user based on the physical and context characteristics of the user,
associate the user to the matching persona in the personae database that most closely matches the profile generated for the user based on the physical and context characteristics of the user, and
associate the user to the user eyewear equipment profile based on the matching persona, the user eyewear equipment profile being based on the one or more persona eyewear equipment profiles of the matching persona.

6. A method for selecting eyewear equipment, comprising:
receiving, by processing circuitry, one or more images, the one or more images including one or more representations of people;
applying, by the processing circuitry, a neural network to the one or more images, wherein the neural network classifies at least one aesthetic component of each image of the one or more images, an aesthetic component score being generated for each image in the one or more images;
generating, by the processing circuitry, a user eyewear equipment profile for a user, the user being matched to a persona from a personae database, each persona in the personae database being linked to one or more persona eyewear equipment profiles, the one or more persona eyewear equipment profiles being based on the aesthetic component score; and
selecting, by the processing circuitry, eyewear equipment for the user based on the generated user eyewear equipment profile,
wherein the aesthetic component score is calculated based on a number of occurrences of an item including a type, a color, a shape, a product, a pattern, a brand, or a product category.

7. The method of claim 6, further comprising:
summing a number of appearances of each classified aesthetic component in the one or more images, wherein the number of appearances is weighed as a function of predeteimined criteria including one or more of a time when an image the item appears in was released, a time period when all the plurality of images including the item were released, a person that provided the image, and feedback of other people regarding the image including social media engagement; and calculating the aesthetic component score for each of the one or more images based on how frequently each aesthetic component appeared in the one or more images, wherein each aesthetic component is weighted based on one or more predetermined criteria and each aesthetic component in each of the one or more images is combined to calculate aesthetic component statistics for the one or more images.

8. The method of claim 7, further comprising:

determining whether the eyewear equipment selection for the user is based on a synthesis of all aesthetic components in the one or more images;

outputting global statistics in response to a determination that the eyewear equipment selection for the user is based on the attribute of all aesthetic components in the one or more images, the global statistics being based on the aesthetic component score;

determining whether the eyewear equipment selection for the user is based on eyewear aesthetic components in the one or more images; and outputting eyewear statistics in response to a determination that the eyewear equipment selection for the user is based on eyewear aesthetic components in the one or more images, the eyewear statistics being based on the aesthetic component score, wherein the aesthetic component score is only incorporated into the global statistics and the eyewear statistics when the aesthetic component score is greater than a predetermined minimum aesthetic component score.

9. The method of claim 6, in response to the received one or more images being from publically available media corresponding to a panel of pre-selected celebrities or trend setters, further comprising:

generating the personae database by defining or computing a set of personae, each persona in the personae database having a human typical profile, the human typical profile being based on physical and context characteristics of the people in the one or more images;

associating each pre-selected celebrity or trend setter with a matching persona in the personae database, the association being based on physical and context characteristics of the pre-selected celebrity or trend setter; and associating eyewear equipment to each persona in the set of personae based on the aesthetic component score of the eyewear equipment of the pre-selected celebrities or trend setters, the associated eyewear equipment to each persona corresponding to the one or more persona eyewear equipment profile.

10. The method of claim 9, in response to the received one or more images being one or more images of the user, further comprising:

generating a profile for the user based on the physical and context characteristics of the user;

associating the user to the matching persona in the personae database that most closely matches the profile generated for the user based on the physical and context characteristics of the user; and associating the user to the user eyewear equipment profile based on the matching persona, the user eyewear equipment profile being based on the one or more persona eyewear equipment profiles of the matching persona.

11. A non-transitory computer-readable storage medium storing computer-readable instructions thereon which, when executed by a computer, cause the computer to perform a method, the method comprising:

receiving one or more images, the one or more images including one or more representations of people, applying a neural network to the one or more images, wherein the neural network classifies at least one aesthetic component of each image of the one or more images, an aesthetic component score being generated for each image in the one or more images, generating a user eyewear equipment profile for a user, the user being matched to a persona from a personae database, each persona in the personae database being linked to one or more persona eyewear equipment profiles, the one or more persona eyewear equipment profiles being based on the aesthetic component score, and selecting eyewear equipment for the user based on the generated user eyewear equipment profile, wherein the aesthetic component score is calculated based on a number of occurrences of an item including a type, a color, a shape, a product, a pattern, a brand, or a product category.

12. The non-transitory computer-readable storage medium of claim 11, further comprising:

summing a number of appearances of each classified aesthetic component in the one or more images, wherein the number of appearances is weighed as a function of predeteimined criteria including one or more of a time when an image the item appears in was released, a time period when all the plurality of images including the item were released, a person that provided the image, and feedback of other people regarding the image including social media engagement; and calculating the aesthetic component score for each of the one or more images based on how frequently each aesthetic component appeared in the one or more images, wherein each aesthetic component is weighted based on one or more predetermined criteria and each aesthetic component in each of the one or more images is combined to calculate aesthetic component statistics for the one or more images.

13. The non-transitory computer-readable storage medium of claim 12, further comprising:

determining whether the eyewear equipment selection for the user is based on a synthesis of all aesthetic components in the one or more images;

outputting global statistics in response to a determination that the eyewear equipment selection for the user is based on the attribute of all aesthetic components in the one or more images, the global statistics being based on the aesthetic component score;

determining whether the eyewear equipment selection for the user is based on eyewear aesthetic components in the one or more images; and outputting eyewear statistics in response to a determination that the eyewear equipment selection for the user is based on eyewear aesthetic components in the one or more images, the eyewear statistics being based on the aesthetic component score, wherein the aesthetic component score is only incorporated into the global statistics and the eyewear statistics when the aesthetic component score is greater than a predetermined minimum aesthetic component score.

14. The non-transitory computer-readable storage medium of claim 11, in response to the received one or more images being from publically available media corresponding to a panel of pre-selected celebrities or trend setters, further comprising:

generating the personae database by defining or computing a set of personae, each persona in the personae database having a human typical profile, the human typical profile being based on physical and context characteristics of the people in the one or more images;

associating each pre-selected celebrity or trend setter with a matching persona in the personae database, the association being based on physical and context characteristics of the pre-selected celebrity or trend setter; and associating eyewear equipment to each persona in the set of personae based on the aesthetic component score of the eyewear equipment of the pre-selected celebrities or trend setters, the associated eyewear equipment to each persona corresponding to the one or more persona eyewear equipment profiles.

15. The non-transitory computer-readable storage medium of claim 14, in response to the received one or more images being one or more images of the user, further comprising:

generating a profile for the user based on the physical and context characteristics of the user;

associating the user to the matching persona in the personae database that most closely matches the profile generated for the user based on the physical and context characteristics of the user; and associating the user to the user eyewear equipment profile based on the matching persona, the user eyewear equipment profile being based on the one or more persona eyewear equipment profiles of the matching persona.

\* \* \* \* \*